(12) United States Patent
Smith et al.

(10) Patent No.: US 11,724,322 B2
(45) Date of Patent: Aug. 15, 2023

(54) SAW BLADE AND METHOD OF MANUFACTURING THE SAME

(71) Applicant: MILWAUKEE ELECTRIC TOOL CORPORATION, Brookfield, WI (US)

(72) Inventors: Steven B. Smith, Waukesha, WI (US); Paul Trautner, Menomonee Falls, WI (US); Brian Harms, Cedarburg, WI (US); John R. Matthews, III, Milwaukee, WI (US); Shane N. Felton, Colgate, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/611,429

(22) PCT Filed: May 16, 2018

(86) PCT No.: PCT/US2018/032916
§ 371 (c)(1),
(2) Date: Nov. 6, 2019

(87) PCT Pub. No.: WO2018/213413
PCT Pub. Date: Nov. 22, 2018

(65) Prior Publication Data
US 2020/0198035 A1    Jun. 25, 2020

Related U.S. Application Data

(60) Provisional application No. 62/508,084, filed on May 18, 2017.

(51) Int. Cl.
*B23D 65/02* (2006.01)
*B23D 61/12* (2006.01)

(52) U.S. Cl.
CPC ........... *B23D 65/02* (2013.01); *B23D 61/121* (2013.01)

(58) Field of Classification Search
CPC ...... B23D 61/121; B23D 65/02; B23D 65/00; B23D 61/02; B23D 61/12; B23D 61/14;
(Continued)

(56) References Cited

U.S. PATENT DOCUMENTS 1,336,209 A    4/1920 Driver
1,523,518 A   10/1923 Dragon
(Continued)

FOREIGN PATENT DOCUMENTS

CN    2843792 Y    12/2006
CN    1923418 A    3/2007
(Continued)

OTHER PUBLICATIONS

Chinese Patent Office First Office Action for Application No. 201880032957.0 dated Jun. 23, 2020 (12 pages including statement of relevance).
(Continued)

*Primary Examiner* — Jason Daniel Prone
(74) *Attorney, Agent, or Firm* — Michael Best & Friedrich LLP

(57) ABSTRACT

A method of manufacturing a saw blade includes providing a saw blade body, forming a plurality of gullets and a first portion of a plurality of tooth bodies in the saw blade body with each gullet positioned between adjacent tooth bodies, and forming a second portion of the plurality of tooth bodies in the saw blade body separate to forming the plurality of gullets and the first portion of the plurality of tooth bodies in the saw blade body.

13 Claims, 19 Drawing Sheets

(58) Field of Classification Search
CPC ........... B27B 33/02; B27B 33/08; B26D 1/00;
B23P 15/28
USPC .................. 76/25.1–50.4, 112; 83/835–855
See application file for complete search history.

(56) References Cited

U.S. PATENT DOCUMENTS

| | | | |
|---|---|---|---|
| D162,794 S | 4/1951 | Derr | |
| 2,741,279 A | 4/1956 | Stratton | |
| 3,374,815 A | 3/1968 | Anderson, Jr. et al. | |
| 4,036,236 A | 7/1977 | Rhodes, Jr. | |
| 4,339,977 A | 7/1982 | Miller | |
| 4,739,557 A | 4/1988 | Wagner | |
| D352,218 S | 11/1994 | Nygards | |
| 5,417,777 A | 5/1995 | Henderer | |
| 5,451,128 A | 9/1995 | Hattersley | |
| 5,758,561 A | 6/1998 | Curtsinger et al. | |
| D406,023 S | 2/1999 | Okada | |
| 5,946,985 A * | 9/1999 | Carlsen | B23D 61/04 |
| | | | 76/112 |
| 6,065,380 A * | 5/2000 | Lundh | B23D 61/121 |
| | | | 30/355 |
| 6,119,571 A | 9/2000 | Hayden, Sr. | |
| 6,244,152 B1 | 6/2001 | Di Nicolantonio | |
| D473,121 S | 4/2003 | Eads | |
| D482,945 S | 12/2003 | Grolimund | |
| D527,233 S | 8/2006 | Burke, III | |
| 7,127,979 B2 | 10/2006 | Kocher et al. | |
| 7,225,714 B2 | 6/2007 | Rompel et al. | |
| D555,444 S | 11/2007 | Ammann | |
| D565,369 S | 4/2008 | Dawson | |
| D686,470 S | 7/2013 | Ji | |
| D688,543 S | 8/2013 | Neitzell et al. | |
| 8,689,667 B2 | 4/2014 | Butzen et al. | |
| D706,099 S | 6/2014 | Neitzell et al. | |
| 8,776,659 B2 | 7/2014 | Butzen et al. | |
| D725,450 S | 3/2015 | Hampton et al. | |
| D732,914 S | 6/2015 | Hampton et al. | |
| 9,079,259 B2 | 7/2015 | Grolimund | |
| 9,132,492 B2 | 9/2015 | Butzen et al. | |
| 9,757,807 B2 | 9/2017 | Hampton et al. | |
| 9,827,626 B2 | 11/2017 | Kazda et al. | |
| 9,884,380 B2 | 2/2018 | Muti et al. | |
| 10,112,244 B2 | 10/2018 | Butzen et al. | |
| D835,955 S | 12/2018 | Bloom et al. | |
| D835,956 S | 12/2018 | Felton et al. | |
| 10,189,099 B2 | 1/2019 | Butzen et al. | |
| 10,252,358 B2 | 4/2019 | Butzen et al. | |
| 10,363,619 B2 | 7/2019 | George et al. | |
| D862,184 S | 10/2019 | Bloom et al. | |
| 2002/0042998 A1 | 4/2002 | Napoli | |
| 2002/0184988 A1 | 12/2002 | Rohman et al. | |
| 2003/0024354 A1 | 2/2003 | Ward et al. | |
| 2003/0200853 A1 | 10/2003 | Gongola | |
| 2004/0060396 A1 | 4/2004 | Tichler et al. | |
| 2005/0211023 A1 | 9/2005 | Kalo | |
| 2005/0211046 A1 | 9/2005 | Thomas et al. | |
| 2005/0262702 A1 | 12/2005 | Hawthorn | |
| 2006/0016315 A1 | 1/2006 | Zorich et al. | |
| 2006/0065098 A1 | 3/2006 | Cranna | |
| 2006/0174495 A1 | 8/2006 | Jumior | |
| 2006/0207398 A1 | 9/2006 | Nicolson et al. | |
| 2007/0151436 A1 | 7/2007 | Donnerdal et al. | |
| 2008/0072411 A1 | 5/2008 | Ahorner et al. | |
| 2009/0119931 A1 | 5/2009 | Gongola | |
| 2009/0126712 A1 | 5/2009 | Kullmann et al. | |
| 2009/0145280 A1 | 6/2009 | Bucks et al. | |
| 2009/0199693 A1 | 8/2009 | Heyen | |
| 2010/0011933 A1 | 1/2010 | Lucas | |
| 2010/0218655 A1 | 9/2010 | Gillette et al. | |
| 2011/0017042 A1 | 1/2011 | Kullmann et al. | |
| 2011/0259168 A1 | 10/2011 | Butzen et al. | |
| 2012/0090443 A1 | 4/2012 | Butzen et al. | |
| 2013/0228059 A1 | 9/2013 | Kazda et al. | |
| 2013/0333541 A1 | 12/2013 | Karlen et al. | |
| 2014/0283667 A1 | 9/2014 | Butzen et al. | |
| 2017/0120356 A1 | 5/2017 | George et al. | |
| 2017/0120357 A1 | 5/2017 | Trautner et al. | |
| 2017/0326661 A1 | 11/2017 | Butzen et al. | |
| 2018/0085838 A1 | 3/2018 | Green | |
| 2018/0099342 A1 | 4/2018 | Muti et al. | |
| 2019/0039158 A1 | 2/2019 | Butzen et al. | |
| 2019/0168320 A1 | 6/2019 | Butzen et al. | |

FOREIGN PATENT DOCUMENTS

| | | |
|---|---|---|
| CN | 101970163 A | 2/2011 |
| CN | 102019314 A | 4/2011 |
| CN | 104918739 A | 9/2015 |
| CN | 106180895 A | 12/2016 |
| DE | 10303915 A1 | 8/2004 |
| DE | 102011054648 A1 | 4/2013 |
| EP | 0072642 A2 | 2/1983 |
| GB | 1253832 A | 11/1971 |
| JP | S293087 Y | 3/1954 |
| JP | S486074 Y | 2/1973 |
| JP | S5271181 U | 11/1975 |
| JP | 2003048121 A | 2/2003 |
| TW | M511388 U | 11/2015 |
| WO | 9006839 A1 | 6/1990 |
| WO | 9605932 A1 | 2/1996 |
| WO | 0170471 A1 | 9/2001 |
| WO | 2011140533 A1 | 11/2011 |

OTHER PUBLICATIONS

Extended European Search Report for Application No. 18802487.1 dated Jan. 22, 2021 (9 pages).
International Search Report and Written Opinion for Application No. PCT/US2018032916 dated Aug. 29, 2018 (14 pages).
Taiwanese Patent Office Action for Application No. 107116848 dated Jan. 4, 2019 (6 pages).

* cited by examiner

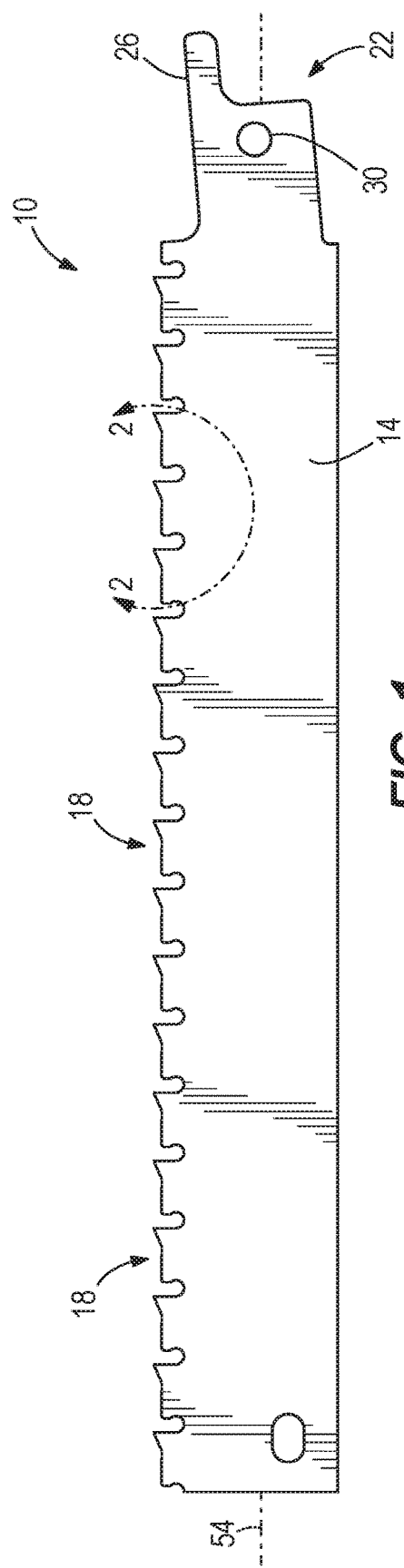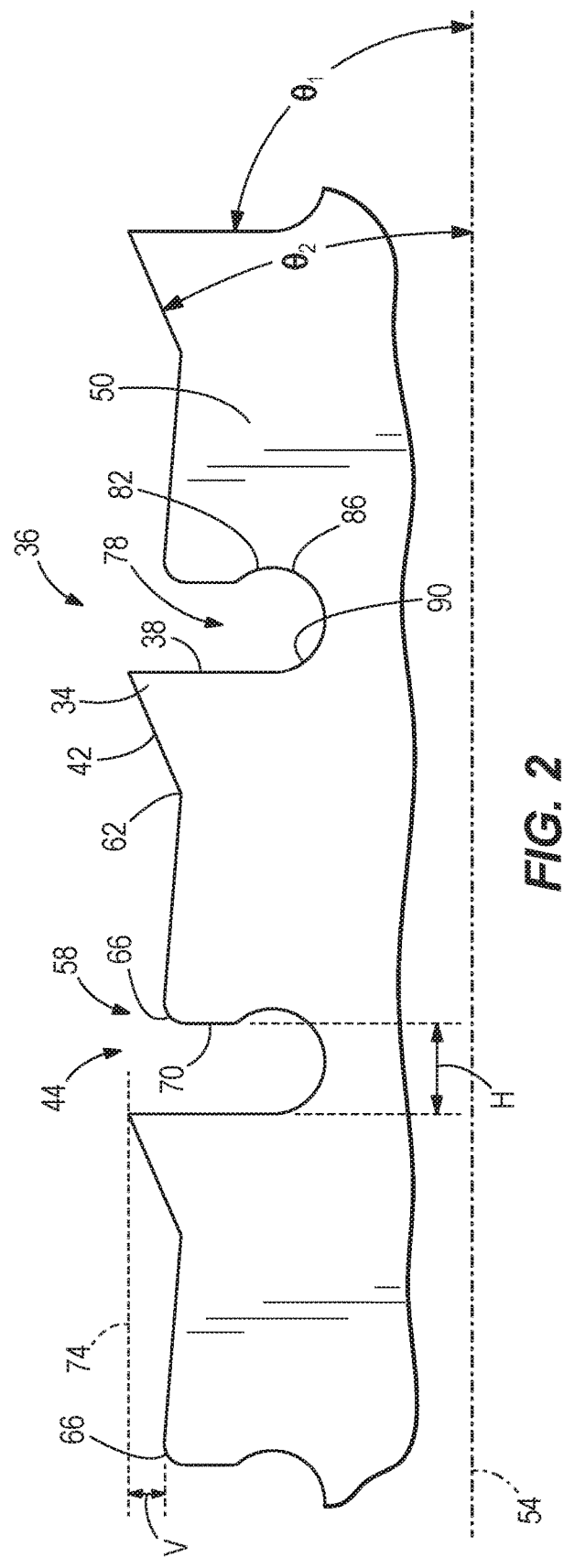

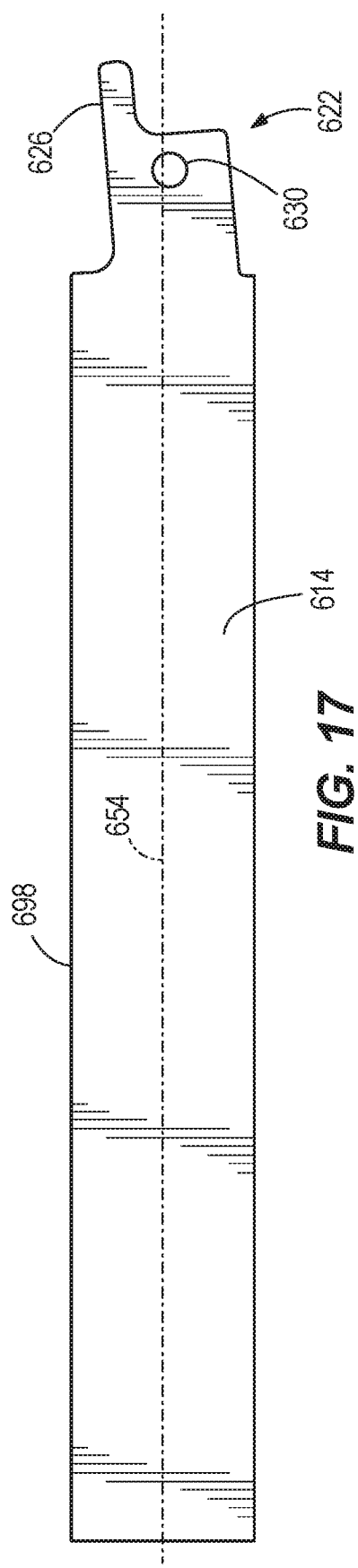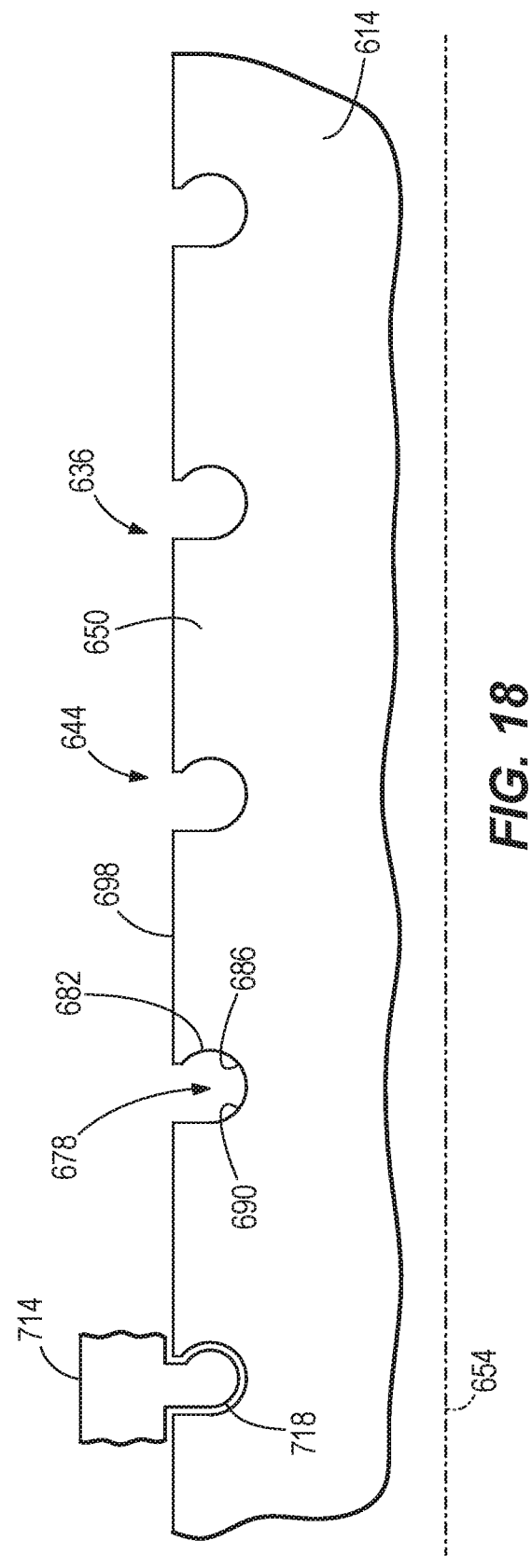

US 11,724,322 B2

SAW BLADE AND METHOD OF MANUFACTURING THE SAME

CROSS-REFERENCE TO RELATED APPLICATIONS

This application is a national phase filing under 35 U.S.C. 371 of International Application No. PCT/US2018/032916 filed on May 16, 2018, which claims priority to U.S. Provisional Patent Application No. 62/508,084, filed on May 18, 2017, the entire contents of which is incorporated herein by reference.

BACKGROUND

The present invention relates to saw blades, and more particularly to methods of manufacturing saw blades.

SUMMARY

In one aspect, a method of manufacturing a saw blade includes providing a saw blade body, forming a plurality of gullets and a first portion of a plurality of tooth bodies in the saw blade body with each gullet positioned between adjacent tooth bodies, and forming a second portion of the plurality of tooth bodies in the saw blade body separate to forming the plurality of gullets and the first portion of the plurality of tooth bodies in the saw blade body.

In another aspect, a method of manufacturing a saw blade includes providing a saw blade body, forming a plurality of gullets in the saw blade body, and forming a plurality of tooth bodies in the saw blade body separate to forming the plurality of gullets in the saw blade body with each tooth body including a rake face extending from a first end of the tooth body toward the saw blade body, a relief face extending from the first end of the tooth body toward a second end of the tooth body sloping toward the saw blade body, and a projection adjacent the second end of the tooth body sloping away from the saw blade body so that an undercut portion of each gullet is positioned between the saw blade body and each projection.

In yet another aspect, a method of manufacturing a saw blade includes providing a saw blade body having an edge, forming a plurality of tooth bodies and a plurality of gullets in the saw blade body with each gullet including an undercut portion positioned between adjacent tooth bodies, coupling a cutting member to the edge of the saw blade body, and shaping the cutting member to form a cutting tooth after the cutting member is coupled to the edge with the cutting tooth including a rake face extending from a tip of the cutting tooth toward the saw blade body and a relief face extending from the tip toward a second end of the cutting tooth sloping toward the saw blade body.

Other aspects of the invention will become apparent by consideration of the detailed description and accompanying drawings.

BRIEF DESCRIPTION OF THE DRAWINGS

FIG. 1 is a side view of a saw blade.
FIG. 2 is an enlarged side view of cutting teeth of the saw blade of FIG. 1.
FIG. 17 illustrates an attachment portion formed in a saw blade body during the method illustrated in FIG. 16.
FIG. 18 illustrates tooth bodies and gullets formed in the saw blade body of FIG. 17.

DETAILED DESCRIPTION

Figure 3:
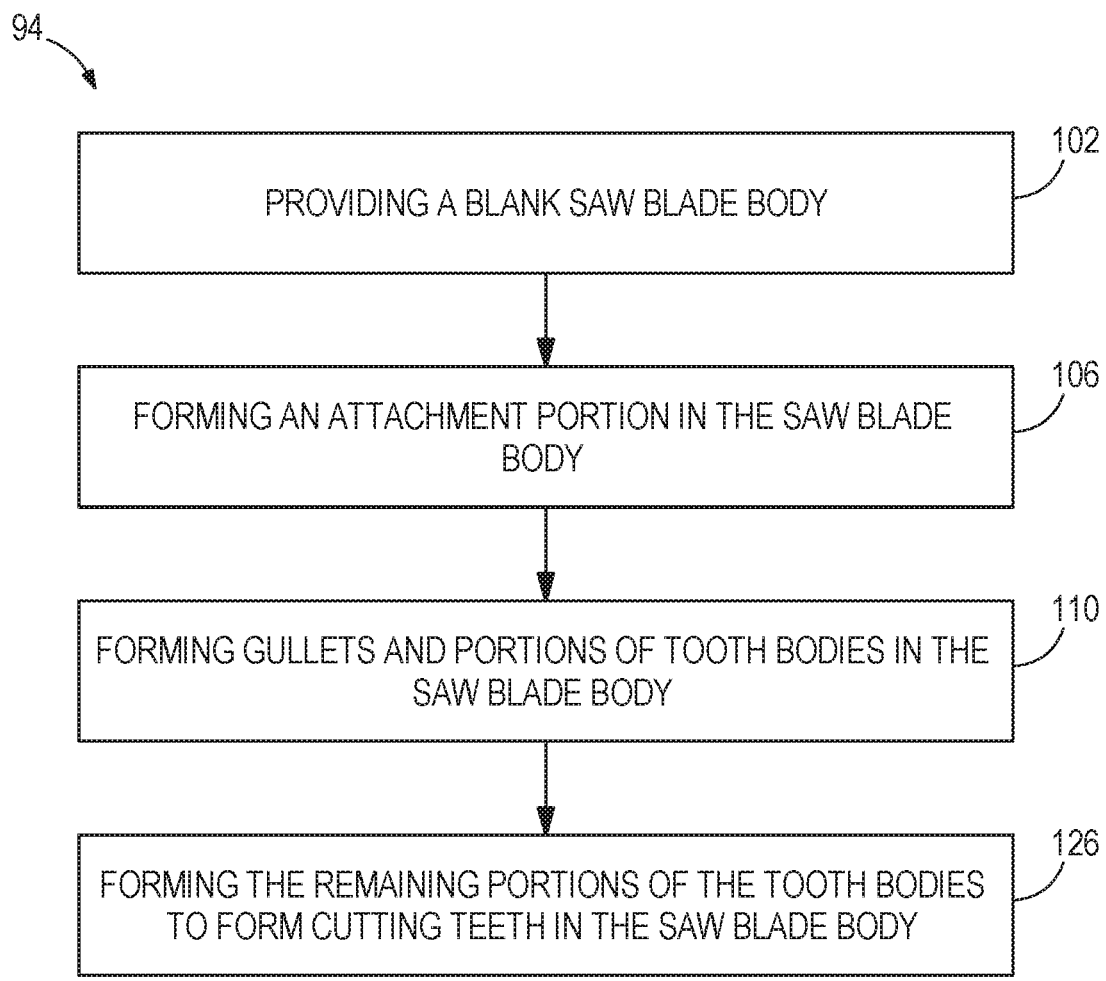
FIG. 3 is a flowchart depicting a method of manufacturing the saw blade of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Terms of degree, such as "substantially," "about," "approximately," etc. are understood by those of ordinary skill to refer to reasonable ranges outside of the given value, for example, general tolerances associated with manufacturing, assembly, and use of the described embodiments.

FIG. 1 illustrates a saw blade 10. The saw blade 10 includes a saw blade body 14 having a plurality of cutting teeth 18 formed thereon. The saw blade 10 also includes an attachment portion 22 extending from the saw blade body 14. The attachment portion 22 has a tang 26 and an aperture 30 for connecting the saw blade 10 to a reciprocating saw (not shown). Before the cutting teeth 18 are formed on the saw blade body 14, the saw blade body 14 is considered to be a saw blade blank. A "blank" refers to a piece of material (e.g., steel coil stock) that is used to form a saw blade before the saw blade is complete (e.g., before the saw blade is fully formed with cutting teeth). In some embodiments, the saw blade 10 may be a bi-metal saw blade. In such embodiments, a majority of the body 14 may be formed of a first, softer material (e.g., spring steel), and an edge section of the body 14 where the cutting teeth 18 are formed may be formed of a second, harder material (e.g., high speed steel). The two materials may be welded together to create the saw blade blank.

FIG. 2 illustrates three of the cutting teeth 18 in more detail. All of the cutting teeth 18 on the saw blade 10 are generally the same shape and size. Each cutting tooth 18 includes a cutting tip portion 34 at a first end 36 of the cutting tooth 18, a rake face 38 adjacent the first end 36, and a relief face 42 extending toward a second end 44 of the cutting tooth 18. Each cutting tip portion 34, rake face 38, and relief face 42 is formed from a portion of a tooth body 50.

The illustrated rake faces 38 extend from each cutting tip portion 34 generally toward a longitudinal axis 54 of the saw blade body 14 (FIG. 2). The longitudinal axis 54 is a linear axis extending along the length of the saw blade body 14. In other embodiments, the longitudinal axis 54 may be curved to wrap around the body of, for example, a hole saw. Each illustrated rake face 38 is defined partially by one cutting tip portion 34 and partially by one tooth body 50. In the illustrated embodiment, the rake faces 38 are oriented at a first angle $\theta_1$ (e.g., substantially 90 degrees) relative to the longitudinal axis 54 of the saw blade body 14. In other embodiments, the rake faces 38 may be angled at any other desired positive, negative, or zero rake angle.

The illustrated relief faces 42 also extend from each cutting tip portion 34, but generally toward the next successive cutting tooth 18 (FIG. 2). In particular, the relief faces 42 extend linearly from each cutting tip portion 34 and are sloped or angled toward the saw blade body 14. Similar to the rake faces 38, the relief faces 42 are defined partially by one cutting tip portion 34 and partially by one tooth body 50. In the illustrated embodiment, each relief face 42 is oriented at a second angle $\theta_2$ (e.g., approximately 25 degrees) relative to the longitudinal axis 54 of the saw blade body 14. In other embodiments, each relief face 42 may be angled at a greater or lesser angle, or each relief face 42 may be at least partially curved.

As shown in FIG. 2, each cutting tooth 18 also includes a projection 58 at the second end 44 of the cutting tooth 18. Each projection 58 is formed from a portion of the tooth body 50 at a distal end 62 of each relief face 42 opposite from each cutting tip portion 34. The projections 58 extend toward the next successive cutting tooth 18. In the illustrated embodiment, each projection 58 is sloped away from the longitudinal axis 54 of the saw blade body 14 relative to each relief face 42 (i.e., upwardly in FIG. 2). In addition, each projection 58 has a rounded portion 66 facing the next successive cutting tip portion 34 and a flat edge 70 defined by the second end 44 of the cutting tooth 18. The illustrated flat edges 70 are oriented substantially perpendicular to the longitudinal axis 54. In other embodiments, the edges 70 may be curved edges.

The illustrated projections 58 are sloped at a smaller angle than the angle of the relief faces 42 so that the rounded portion 66 of each projection 58 is closer to the cutting tip portion 34 of the cutting tooth 18 than the saw blade body 14. More specifically, the cutting tip portions 34 of the cutting teeth 18 define a plane 74 that is generally parallel to the longitudinal axis 54 of the saw blade body 14, and the rounded portions 66 of the projections 58 are spaced a vertical distance V from the plane 74 measured in a vertical direction perpendicular to the longitudinal axis 54 and to the plane 74.

In addition, a portion of the rounded portions 66 of each projection 58 is positioned between the distal end 62 of the relief faces 42 and the plane 74 in the vertical direction perpendicular to the plane 74. In the illustrated embodiment, the rounded portion 66 of each projection 58 is also positioned between each distal end 62 of the relief faces 42 and each flat edge 70 of the projections 58 in a horizontal direction parallel to the plane 74. The illustrated flat edges 70 of the cutting teeth 18 are also spaced a horizontal distance H from the rake faces 38 of the next successive cutting tooth 18. The horizontal distance H is measured in a direction perpendicular to the rake faces 38 of each cutting tooth 18.

As also shown in FIG. 2, gullets 78 are formed on the saw blade body 14 between the cutting teeth 18 (e.g., the rake face 38 of one cutting tooth 18 and the projection 58 of another cutting tooth 18 partially define a gullet 78 between two successive cutting teeth 18). The illustrated gullets 78 include an undercut portion 82 that is formed between the projection 58 and the saw blade body 14 (i.e., beneath the projection 58 in the vertical direction). In particular, each illustrated undercut portion 82 is defined by a rear edge 86 having a first curvature of each tooth body 50. The undercut portions 82 are arranged so that the flat edge 70 of each projection 58 is positioned between the undercut portion 82 of one cutting tooth 18 and the cutting tip portion 34 of an adjacent cutting tooth 18 in the horizontal direction parallel to the longitudinal axis 54. The gullets 78 are also defined by a forward edge 90 having a second curvature of each tooth body 50. The first curvature of the rear edge 86 and the second curvature of the forward edge 90 have a constant radius so that the illustrated gullets 78 are generally circular (e.g., less than 270 degrees). The undercut portions 82 increase the size of the gullets 78, yet still allow the projections 58 to extend relatively close to the cutting tip portions 34 of the next successive cutting tooth 18. In other embodiments, the undercut portion 82 can be omitted so that the gullets 78 form straight gullets. In the illustrated embodiment, a first distance defined between the flat edges 70 of each projection 58 and the cutting tip portion 34 of an adjacent tooth body 18 is less than a second distance between the rear edge 86 of each cutting tooth 18 and the rake face 38 of an adjacent cutting tooth 18 in the horizontal direction.

Figure 4:
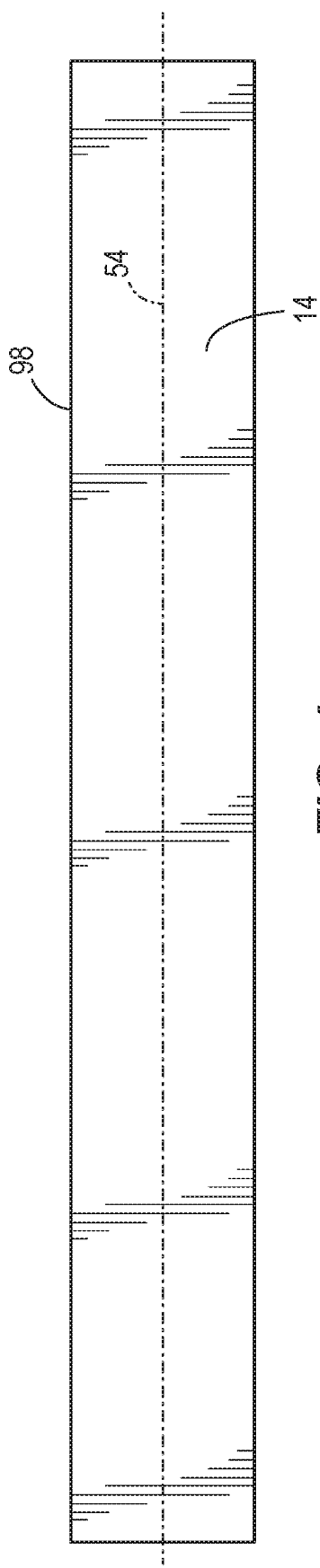
FIG. 4 illustrates a saw blade body of the saw blade of FIG. 1.
Figure 5:
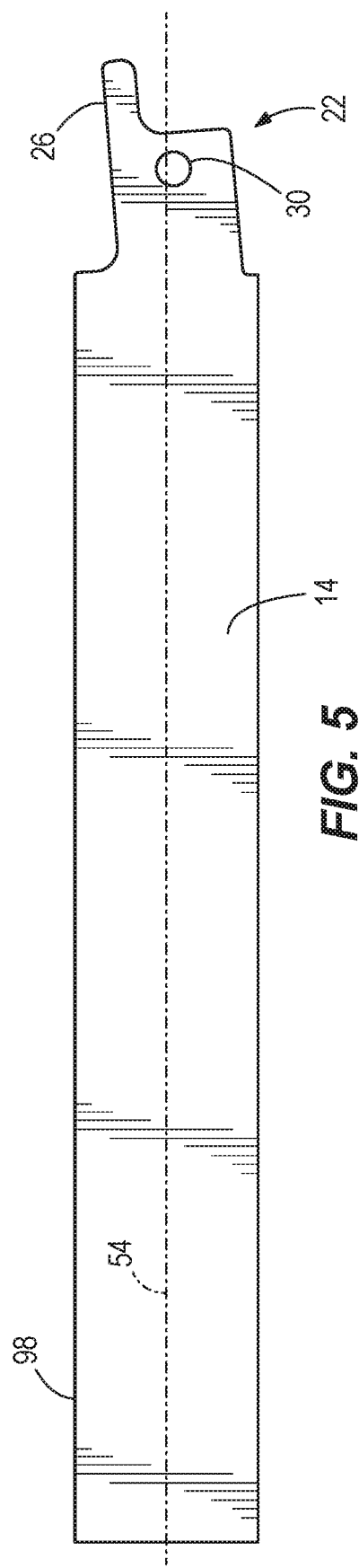
FIG. 5 illustrates an attachment portion formed in the saw blade body of FIG. 4.
Figure 6:
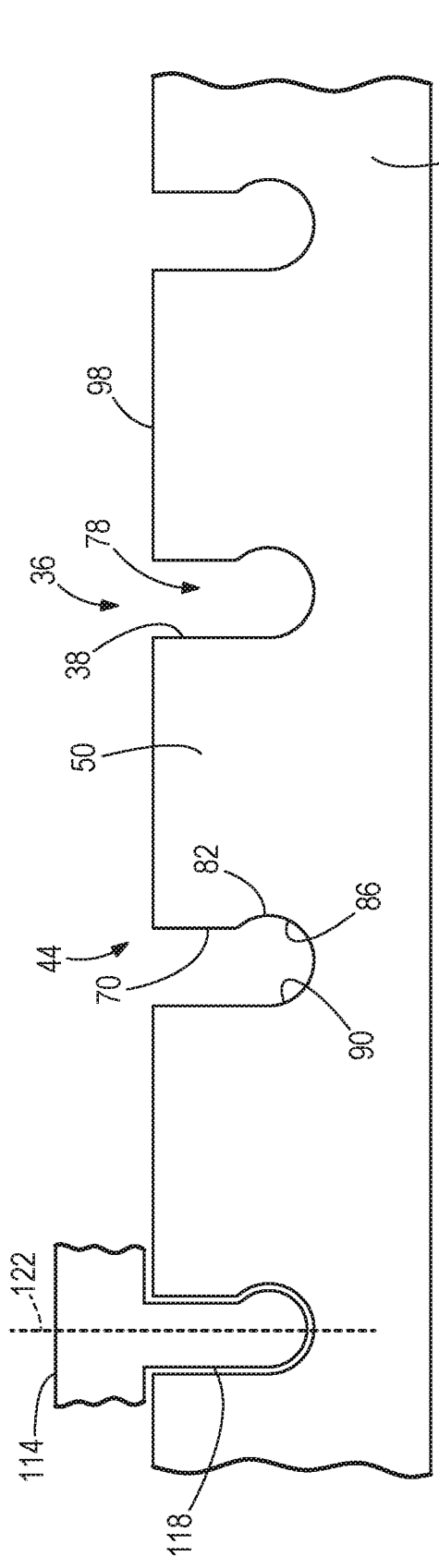
FIG. 6 illustrates tooth bodies and gullets formed in the saw blade body of FIG. 4.
Figure 7:
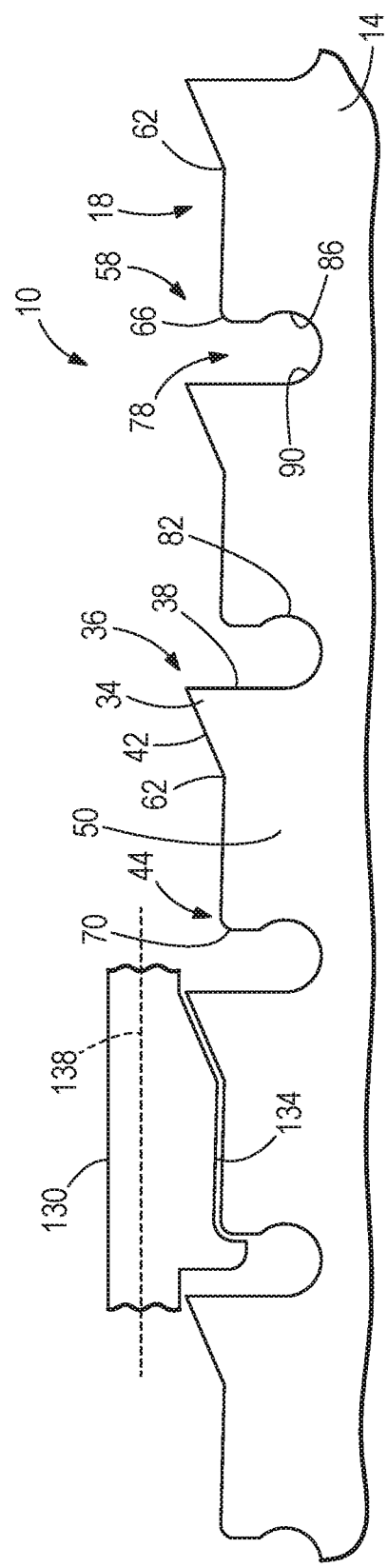
FIG. 7 illustrates cutting teeth formed in the saw blade body of FIG. 4 with the gullets of FIG. 6 positioned between the cutting teeth.

With reference to FIG. 3, a method 94 of manufacturing the saw blade 10 is illustrated. A blank saw blade body 14 (e.g., omitting the tooth bodies 50 and the gullets 78) is provided and includes an edge 98 (step 102; FIG. 4). The attachment portion 22 is formed (e.g., by a stamping process) in an end of the saw blade body 14 (step 106; FIG. 5). With reference to FIGS. 3 and 6, step 110 is provided to form the gullets 78 and portions of the tooth bodies 50 in the saw blade body 14 using a first stamping die 114 (only a portion of the first stamping die 114 is illustrated in FIG. 6). The first stamping die 114 includes first cutting profiles 118 (only one cutting profile 118 is illustrated in FIG. 6) having a first longitudinal axis 122 that extends substantially toward the longitudinal axis 54 of the saw blade body 14. The longitudinal axis 122 is the axis extending parallel to the major (i.e., largest) dimension of the cutting profile 118. The first cutting profiles 118 are shaped to include the same geometry as the flat edges 70, the gullets 78, and the rake faces 38 so that the first stamping die 114 simultaneously forms all of the flat edges 70, the gullets 78, and the rake faces 38 in the saw blade body 14. In the illustrated embodiment, the first longitudinal axis 122 and the rake faces 38 are oriented at the same angle relative to the longitudinal axis 54 of the saw blade body 14. With reference to FIGS. 3 and 7, step 126 is provided to form the remaining portions of the tooth bodies 50 to form the cutting teeth 18 in the saw blade body 14 using a second stamping die 130 (only a portion of the second stamping die 130 is illustrated in FIG. 7). The second stamping die 130 includes second cutting profiles 134 (only one cutting profile 134 is illustrated in FIG. 7) having a second longitudinal axis 138 that extends substantially parallel to the longitudinal axis 54 of the saw blade body 14. The longitudinal axis 138 is the axis extending parallel to the major (i.e., largest) dimension of the cutting profile 134. The second cutting profiles 134 are different in shape than the first cutting profiles 118. The second cutting profiles 134 are shaped to include the same geometry as the relief faces 42 and the projections 58 so that the second stamping die 130 simultaneously forms all of the relief faces 42 and the projections 58 in the saw blade body 14.

In sum, the method 94 includes two steps 110, 126 each including a die 114, 130 oriented differently relative to the longitudinal axis 54 of the saw blade body 14 (e.g., the dies 114, 130 are oriented substantially perpendicular to each other) to form the cutting teeth 18 having sharp cutting tip portions 34 without performing a separate step (e.g., grinding) to sharpen the cutting tip portions 34. In particular, without performing a separate grinding step, efficiencies of manufacturing the saw blade 10 are increased.

The stamping process is advantageous (e.g., quicker) over other machining processes (e.g., milling, grinding, etc.) to facilitate formation of the gullets 78 with the undercut portions 82 and the cutting teeth 18. In the illustrated embodiment, the step 110 (e.g., forming the gullets 78 and portions of the tooth bodies 50) is performed before the step 126 (e.g., forming the remaining portions of the tooth bodies 50 to form the cutting teeth 18). In other embodiments, the step 126 can be performed before the step 110 (e.g., the relief faces 42 and the projections 58 are formed in the saw blade body 14 before the flat edges 70, the gullets 78, and the rake faces 38 are formed in the saw blade body 14). In some embodiments, the attachment portion 22 may be formed (step 106) in the saw blade body 14 after, before, or between steps 110 and 126. In other embodiments, the tooth bodies 50, the gullets 78, and/or the attachment portion 22 may be at least partially formed by another process (e.g., chemical erosion, electrical discharge machining, grinding wheels, water jet cutting, laser cutting, etc.).

In the illustrated embodiment, the saw blade 10 includes five teeth per inch (i.e., TPI). In other embodiments, the saw blade 10 may include fewer or more TPI (e.g., four TPI, six TPI, or any fractional number of TPI between four and six). The addition of projections 58 and the gullets 78 with the undercut portions 82 to the saw blade 10 allow the saw blade 10 to be manufactured with fewer teeth per inch (e.g., 4-5 TPI vs. 6 TPI in conventional saw blades) so that fewer cutting tip portions 34 need to be included on the saw blade 10. In addition, the projections 58 help protect the successive cutting tip portions 34 from damage. In some embodiments, the projections 58 on the cutting teeth 18 may be omitted.

Figure 9:
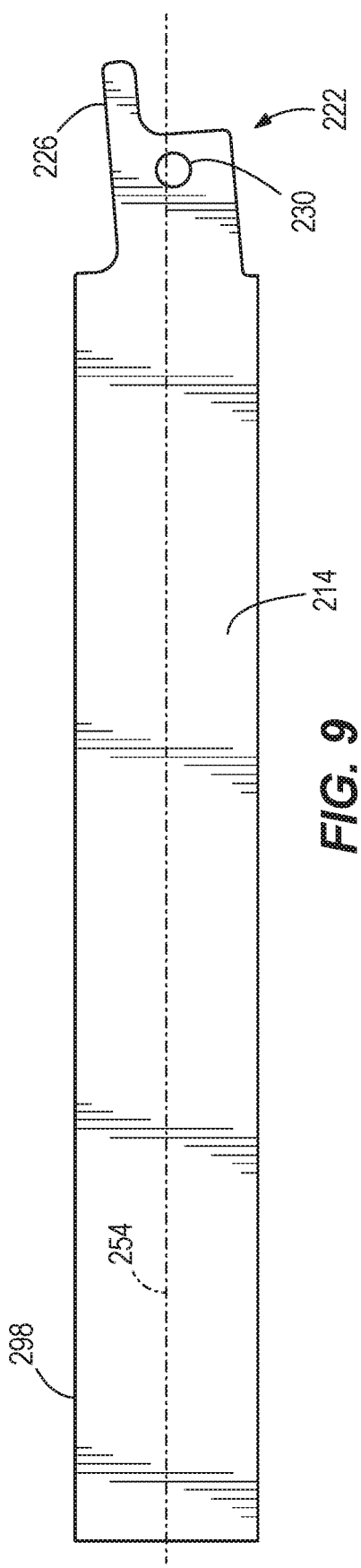
FIG. 9 illustrates an attachment portion formed in a saw blade body during the method illustrated in FIG. 8.
Figure 10:
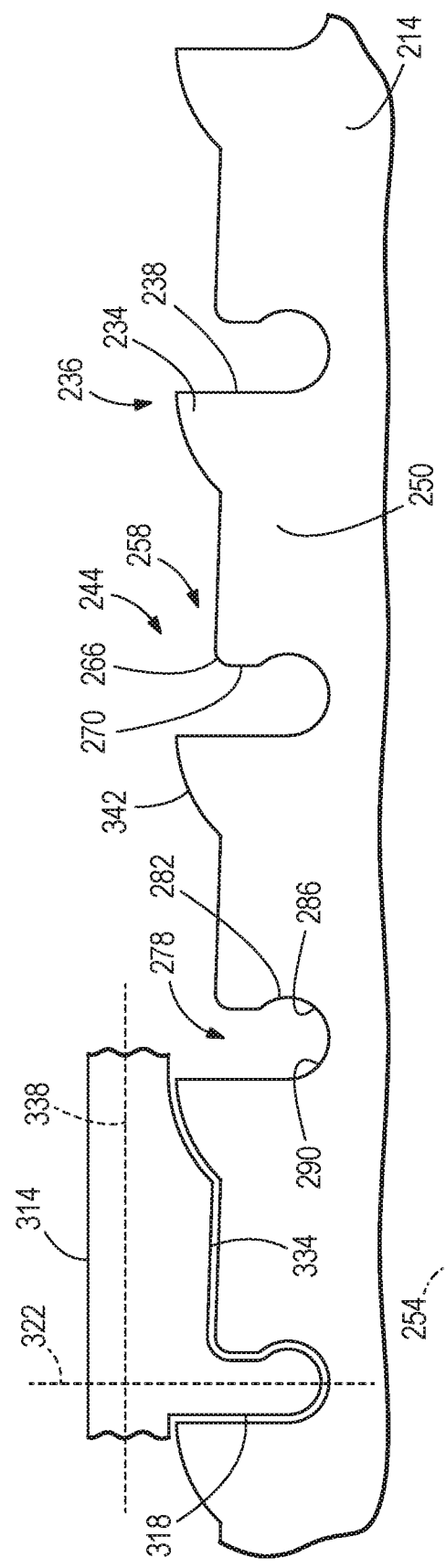
FIG. 10 illustrates tooth bodies and gullets formed in the saw blade body of FIG. 9.
Figure 11:
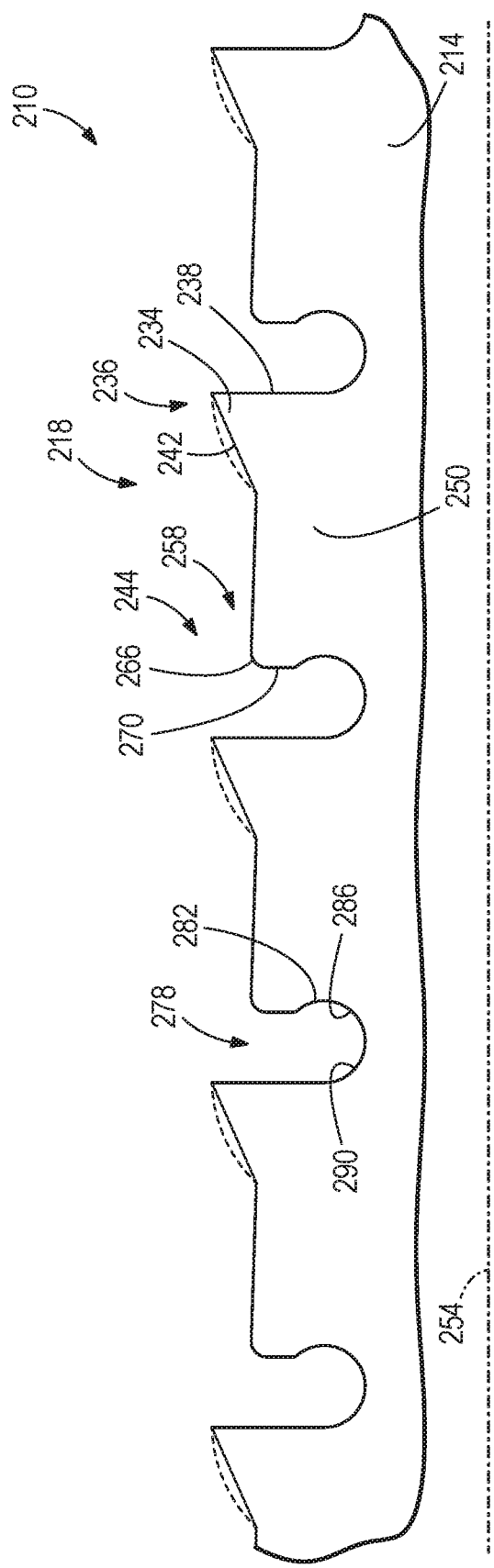
FIG. 11 illustrates cutting teeth formed in the saw blade body of FIG. 9 with the gullets of FIG. 10 positioned between the cutting teeth.

FIGS. 8-11 illustrate a saw blade body 214 (FIG. 9) that is formed into a saw blade 210 (only a portion of the saw blade 210 is illustrated in FIG. 11) according to an embodiment of the invention. The saw blade 210 is similar to the saw blade 10; therefore, like components have been given like reference numbers plus 200. At least some differences and/or at least some similarities between the saw blades 10, 210 will be discussed in detail below. In addition, components or features described with respect to the saw blade 210 are equally applicable to the components or features described with respect to the saw blade 10.

Figure 8:
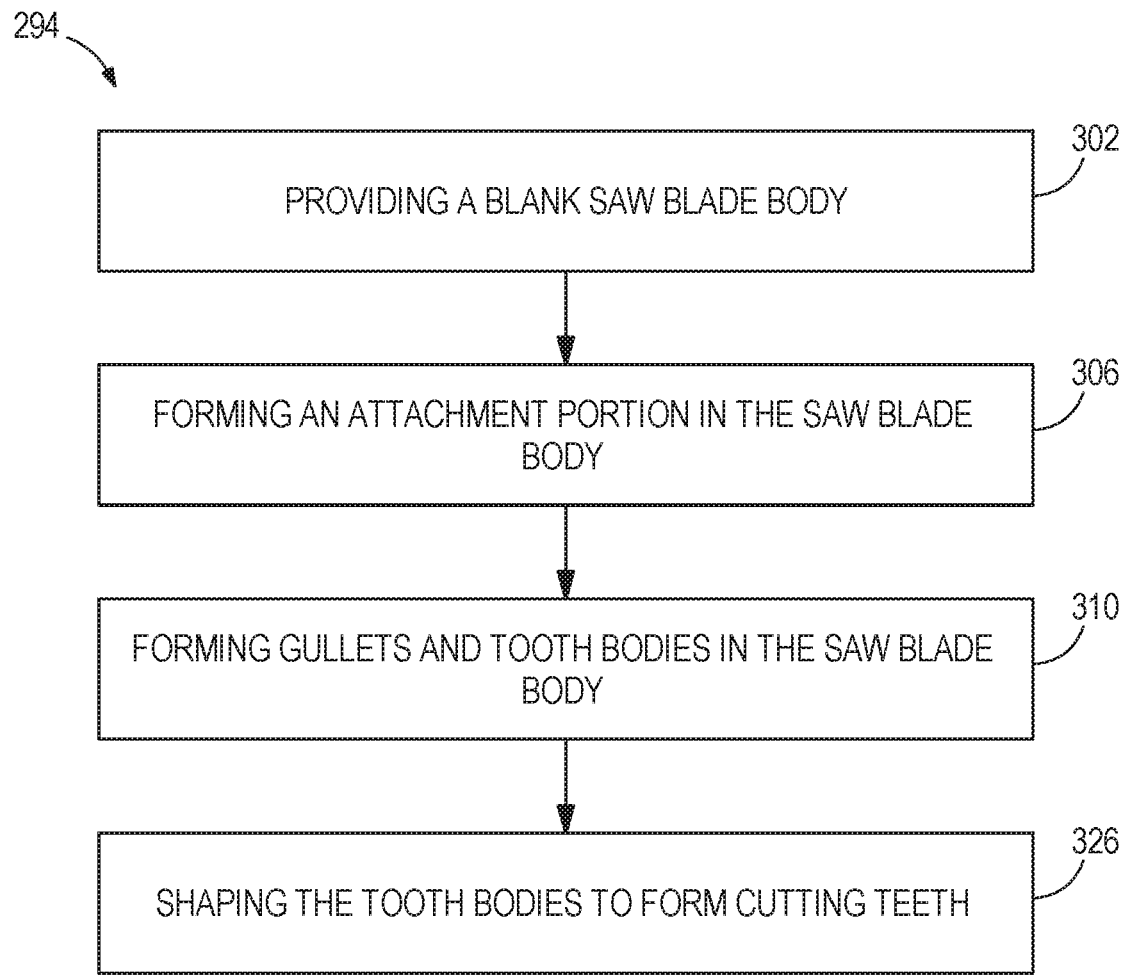
FIG. 8 is a flowchart depicting another method of manufacturing a saw blade.

With reference to FIG. 8, a method 294 of manufacturing the saw blade 210 is illustrated. A blank saw blade body 214 (e.g., similar to the blank saw blade body 14; FIG. 4) is provided (step 302) and includes a longitudinal axis 254 and an edge 298. An attachment portion 222 is formed in an end of the saw blade body 214 (step 306; FIG. 9). The attachment portion 222 includes a tang 226 and an aperture 230. With reference to FIGS. 8 and 10, step 310 is provided to form both gullets 278 and tooth bodies 250 in the saw blade body 14 using a single stamping die 314 (only a portion of the stamping die 314 is illustrated in FIG. 10). The stamping die 314 includes first cutting profiles 318 having a first longitudinal axis 322 and second cutting profiles 334 having a second longitudinal axis 338 (only one set of cutting profiles 318, 334 is illustrated in FIG. 10). The tooth bodies 250 include first ends 236 having rake faces 238 and cutting tip portions 234 and second ends 244 having projections 258 with rounded portions 266 and flat edges 270. In addition, the gullets 278 include forward edges 290 and undercut portions 282 having rear edges 286.

As a result of the stamping die 314 forming the tooth bodies 250, a curved edge 342 is formed on relief faces 242 of the tooth bodies 250 (FIG. 10). In order for the saw blade 210 to include cutting teeth 218 having sharp cutting tip portions 234, the tooth bodies 250 are further shaped (e.g., by cold working or a forging process) to eliminate the curved edges 342 of the relief faces 242. In particular, step 326 is provided to shape the tooth bodies 250 to form sharp cutting teeth 218 (e.g., by eliminating the curved edges 342). Furthermore, the method 294 does not include an additional grinding step to sharpen the cutting tip portions 234.

Figure 13:
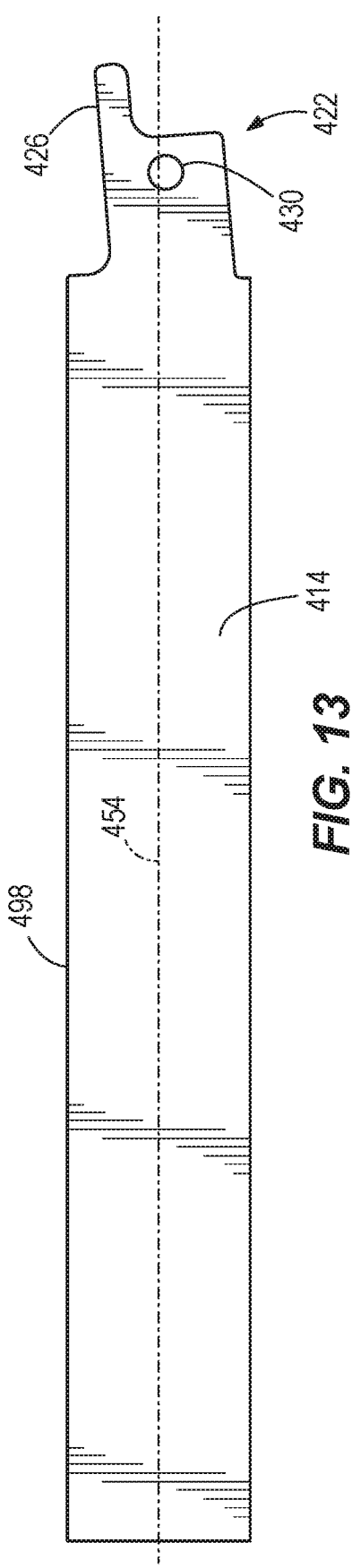
FIG. 13 illustrates an attachment portion formed in a saw blade body during the method illustrated in FIG. 12.
Figure 14:
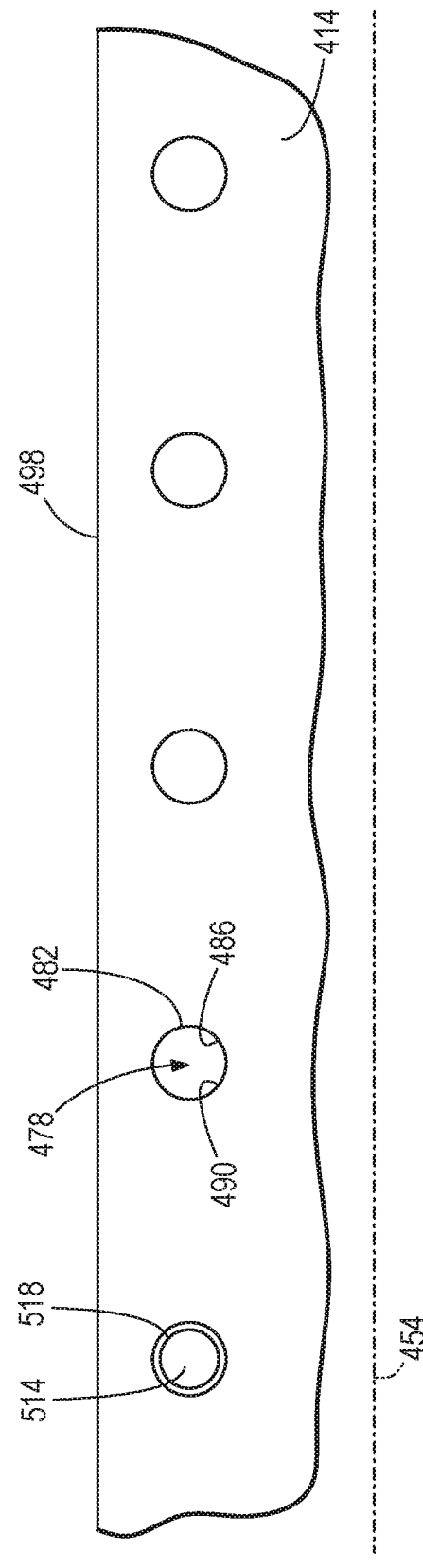
FIG. 14 illustrates gullets formed in the saw blade body of FIG. 13.
Figure 15:
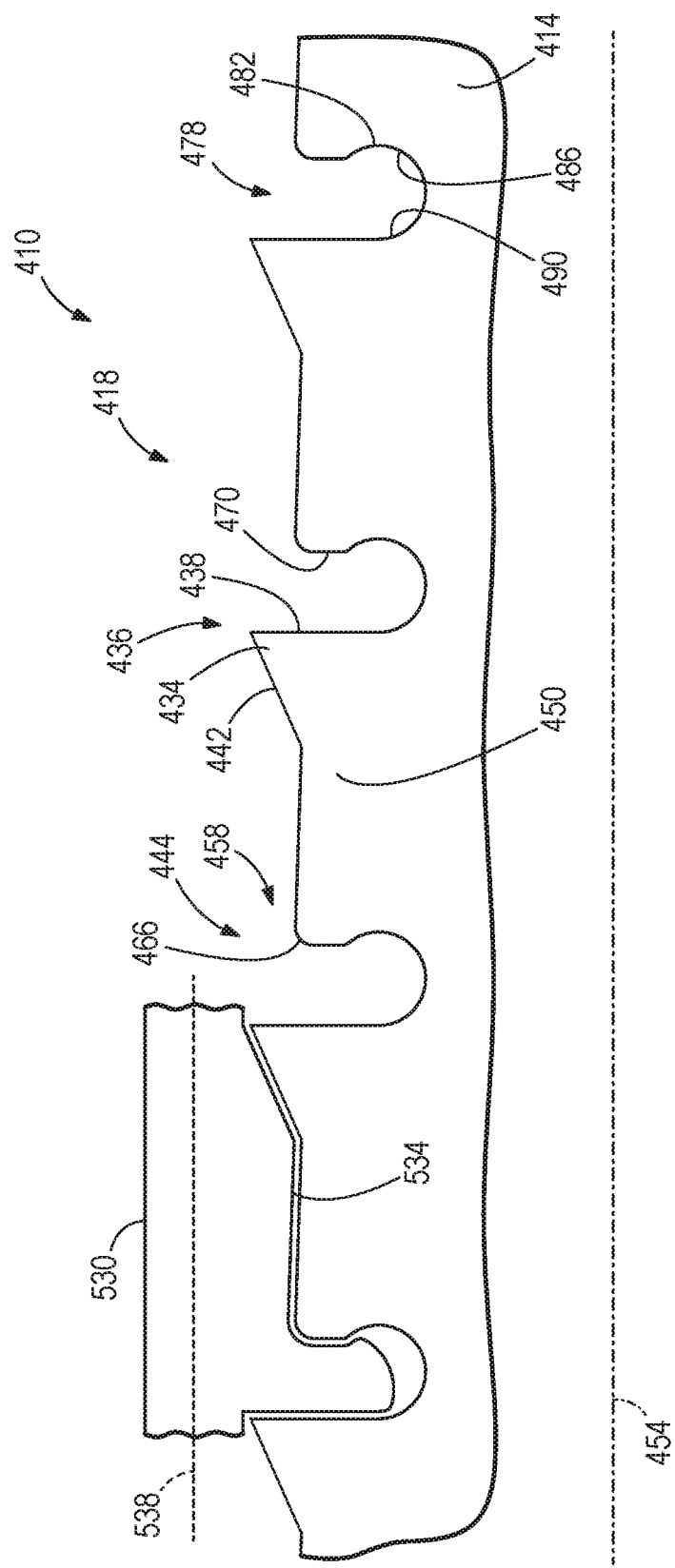
FIG. 15 illustrates cutting teeth formed in the saw blade body of FIG. 13 with the gullets of FIG. 14 positioned between the cutting teeth.

FIGS. 12-15 illustrate a saw blade body 414 (FIG. 13) that is formed into a saw blade 410 (only a portion of the saw blade 410 is illustrated in FIG. 15) according to an embodiment of the invention. The saw blade 410 is similar to the saw blade 10; therefore, like components have been given like reference numbers plus 400. At least some differences and/or at least some similarities between the saw blades 10, 410 will be discussed in detail below. In addition, components or features described with respect to the saw blade 410 are equally applicable to the components or features described with respect to the saw blades 10, 210.

Figure 12:
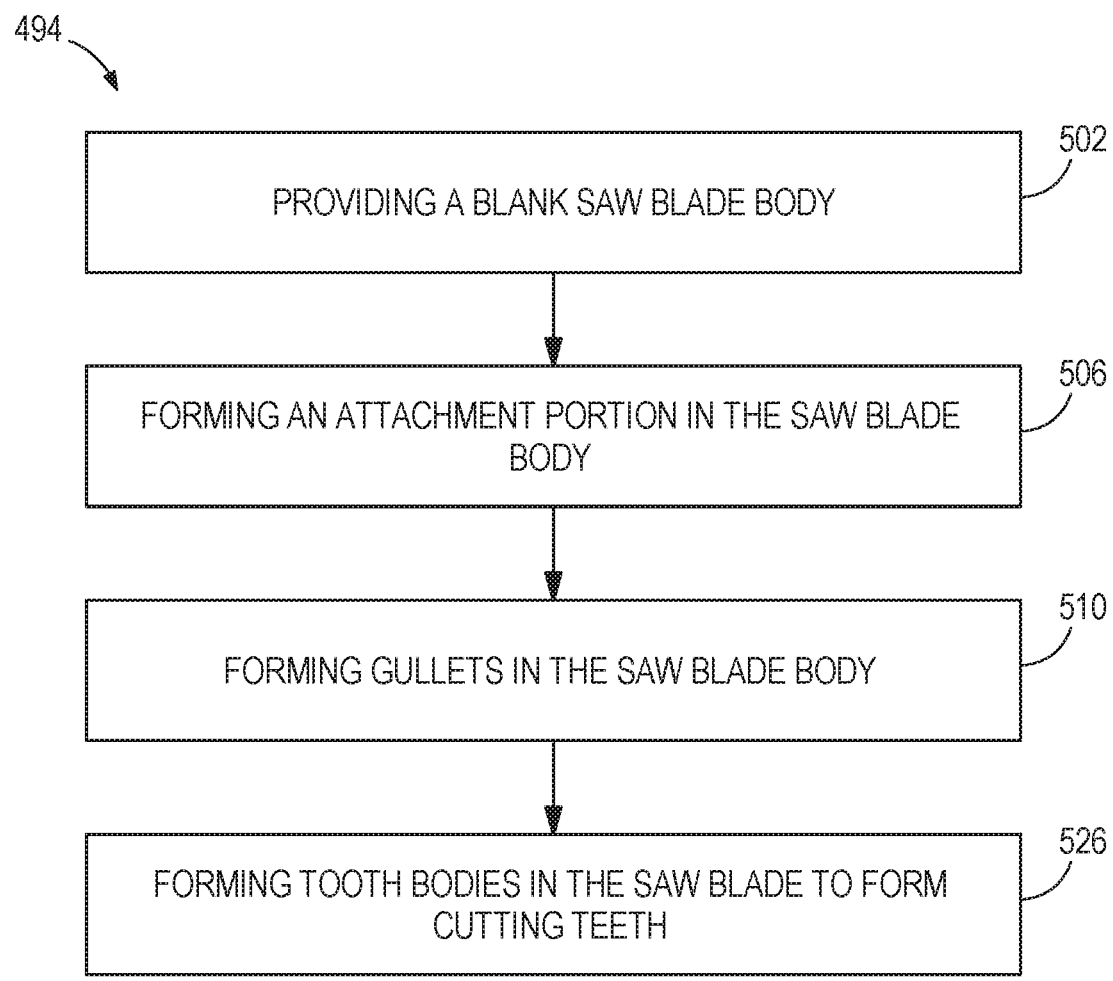
FIG. 12 is a flowchart depicting another method of manufacturing a saw blade.

With reference to FIG. 12, a method 494 of manufacturing the saw blade 410 is illustrated. A blank saw blade body 414 (e.g., similar to the blank saw blade body 14; FIG. 4) is provided (step 502) and includes a longitudinal axis 454 and an edge 498. An attachment portion 422 is formed in an end of the saw blade body 414 (step 506; FIG. 13). The attachment portion 422 includes a tang 426 and an aperture 430. With reference to FIGS. 12 and 14, step 510 is provided to form gullets 478 in the saw blade body 414 using a first stamping die 514 (only a portion of the first stamping die 514 is illustrated in FIG. 14). The first stamping die 514 includes first cutting profiles 518 defining a circular profile (only one cutting profile 518 is illustrated in FIG. 14). The gullets 478 include forward edges 490 and undercut portions 482 having rear edges 486 with the gullets 478 spaced from the edge 498 of the saw blade body 414. In the illustrated embodiment, the gullets 478 formed by the first stamping die 514 are enclosed apertures that are bounded by material of the saw blade body 414 on all sides. In such an embodiment, less material is removed during this first stamping step such that less force is required to push the first stamping die 514 through the saw blade body 414.

With reference to FIGS. 12 and 15, step 526 is provided to form tooth bodies 450 in the saw blade body 414 using a second stamping die 530 (only a portion of the second stamping die 530 is illustrated in FIG. 15) to ultimately form cutting teeth 418. The second stamping die 530 includes second cutting profiles 534 (only one cutting profile 534 is illustrated in FIG. 15). The tooth bodies 450 include first ends 436 having rake faces 438 and cutting tip portions 434 and second ends 444 having projections 458 with rounded portions 466 and flat edges 470. Relief faces 442 are also formed by the second stamping die 530 between the first ends 436 and the second ends 444 of the tooth bodies 450. The second stamping die 530 also connects the gullets 478 formed by the first stamping die 514 to the edge of the saw blade body 414. In the illustrated embodiment, each second cutting profile 534 includes a longitudinal axis 538 that extends substantially parallel to the longitudinal axis 454 of the saw blade body 414. Because the method 494 includes a first stamping step at step 510 that removes most of the material for the gullets 478, the second stamping step at step 526 removes less material and can be more controlled to form sharp cutting tip portions 434. As such, the method 494 does not include an additional grinding step to sharpen the cutting tip portions 434.

Figure 19:
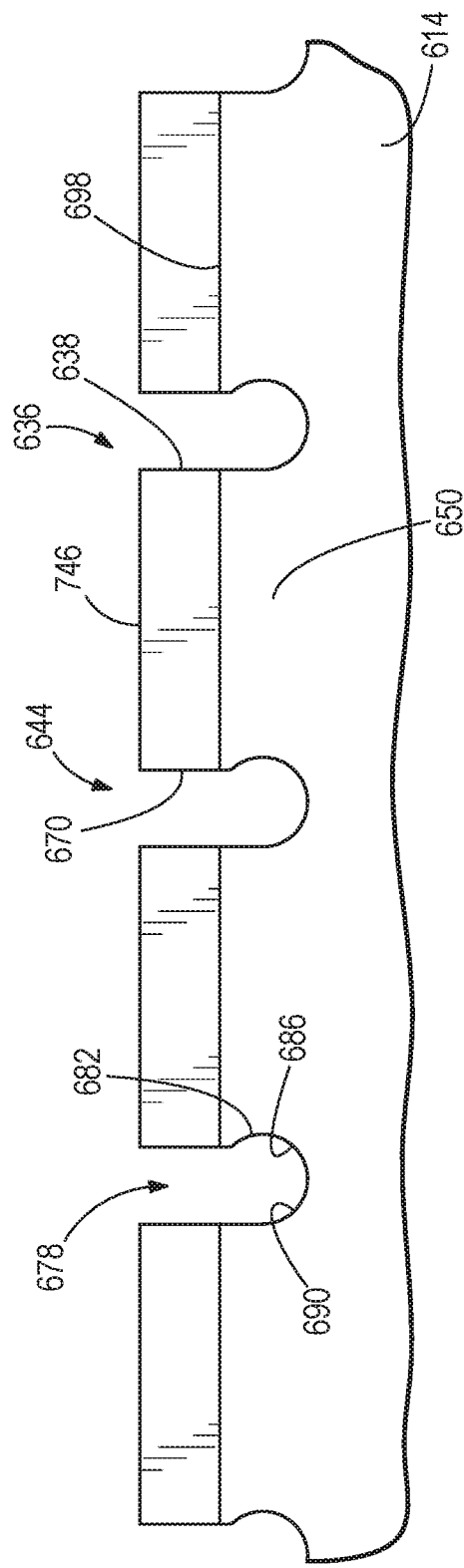
FIG. 19 illustrates cutting inserts coupled to the tooth bodies of FIG. 18.
Figure 20:
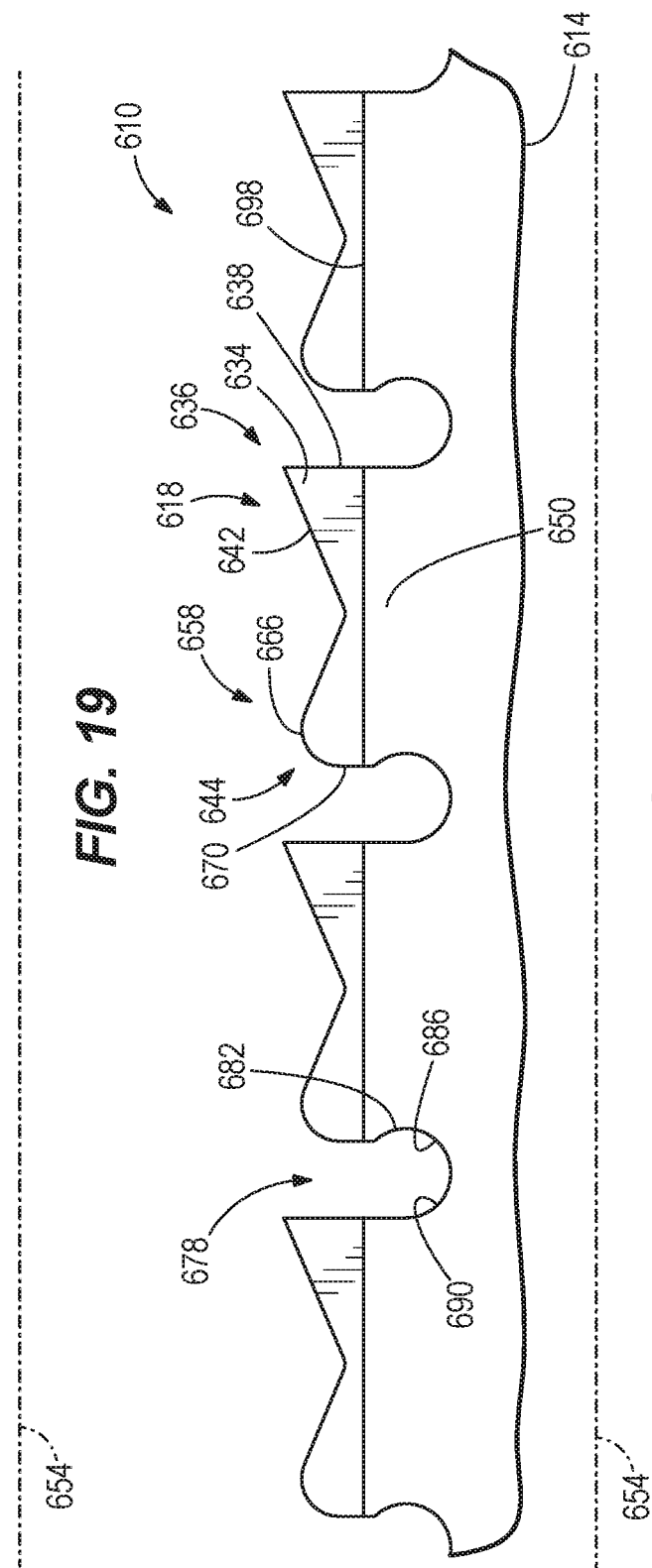
FIG. 20 illustrates cutting teeth formed by the cutting inserts and the tooth bodies of FIG. 19 with gullets positioned between the cutting teeth.

FIGS. 16-20 illustrate a saw blade body 614 (FIG. 17) that is formed into a saw blade 610 (only a portion of the saw blade 610 is illustrated in FIG. 20) according to an embodiment of the invention. The saw blade 610 is similar to the saw blade 10; therefore, like components have been given like reference numbers plus 600. At least some differences and/or at least some similarities between the saw blades 10, 610 will be discussed in detail below. In addition, components or features described with respect to the saw blade 610 are equally applicable to the components or features described with respect to the saw blades 10, 210, 410.

Figure 16:
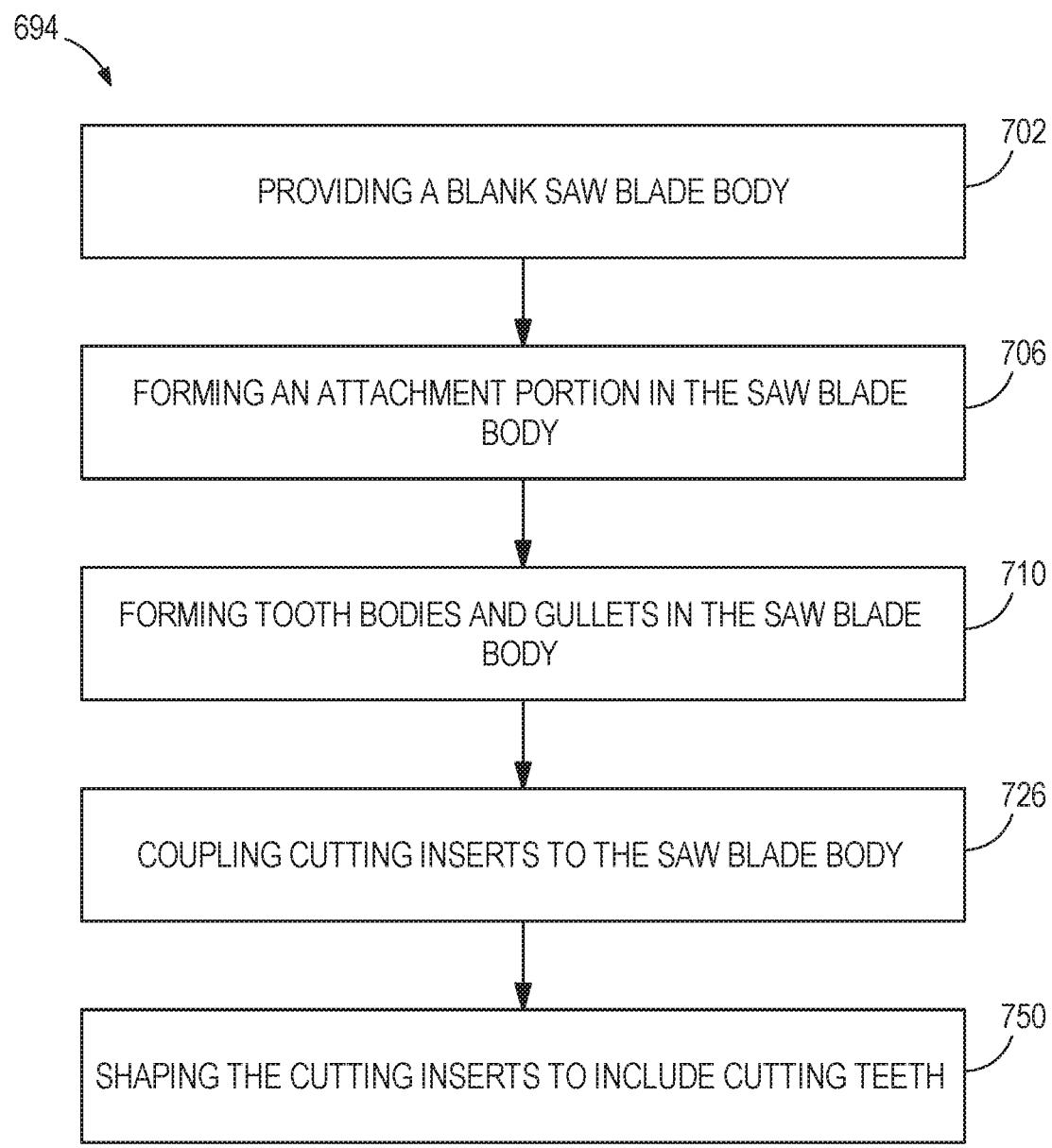
FIG. 16 is a flowchart depicting another method of manufacturing a saw blade.

With reference to FIG. 16, a method 694 of manufacturing the saw blade 610 is illustrated. A blank saw blade body 614 (e.g., similar to the blank saw blade body 14; FIG. 4) is provided (step 702) and includes a longitudinal axis 654 and an edge 698. An attachment portion 622 is formed in an end of the saw blade body 614 (step 706; FIG. 17). The attachment portion 622 includes a tang 626 and an aperture 630. With reference to FIGS. 16 and 18, step 710 is provided to form tooth bodies 650 and gullets 678 in the saw blade body 614 using a first stamping die 714 (only a portion of the first stamping die 714 is illustrated in FIG. 18). The first stamping die 714 includes first cutting profiles 718 (only one cutting profile 718 is illustrated in FIG. 18). The gullets 678 include forward edges 690 and undercut portions 682 having rear edges 686.

With reference to FIGS. 16 and 19, step 726 is provided to couple cutting inserts (e.g., carbide cutting members) 746 to the edge 698 of the saw blade body 614 (e.g., by a welding, brazing, etc. process). Each cutting insert 746 is coupled to a tooth body 650 between adjacent gullets 678 to partially form cutting teeth 618. For example, the cutting inserts 746 form rake faces 638 on first ends 636 of the tooth bodies 650 and flat edges 670 on second ends 644 of the tooth bodies 650. In other embodiments, the cutting inserts 746 can be metallic inserts including a higher material hardness than the saw blade body 614.

With reference to FIGS. 16 and 20, step 750 is provided to shape the cutting inserts 746 to include the cutting teeth 618. In one embodiment, shaping the cutting inserts 746 includes grinding the cutting inserts 746 to include the cutting teeth 618. In other embodiments, shaping the cutting inserts 746 includes another type of forming process (e.g., chemical erosion, electrical discharge machining, water jet cutting, laser cutting, etc.). The cutting inserts 746 are shaped to include cutting tip portions 634, relief faces 642, and projections 658 having rounded portions 666.

Figure 23:
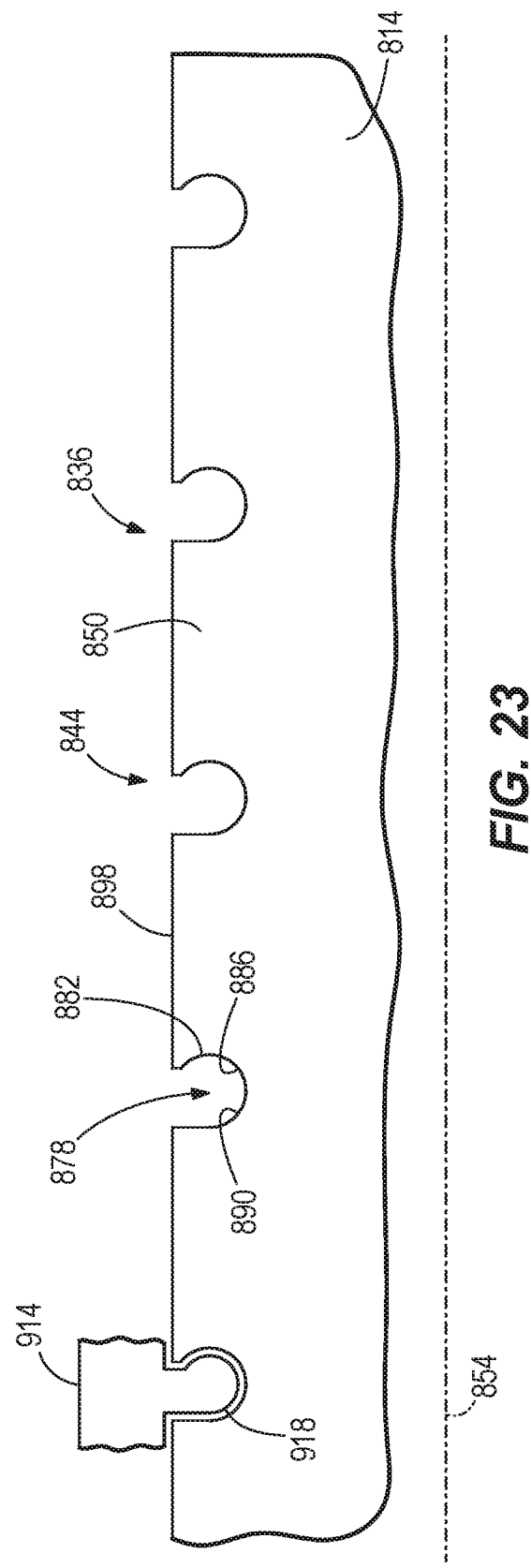
FIG. 23 illustrates tooth bodies and gullets formed in the saw blade body of FIG. 22.
Figure 24:
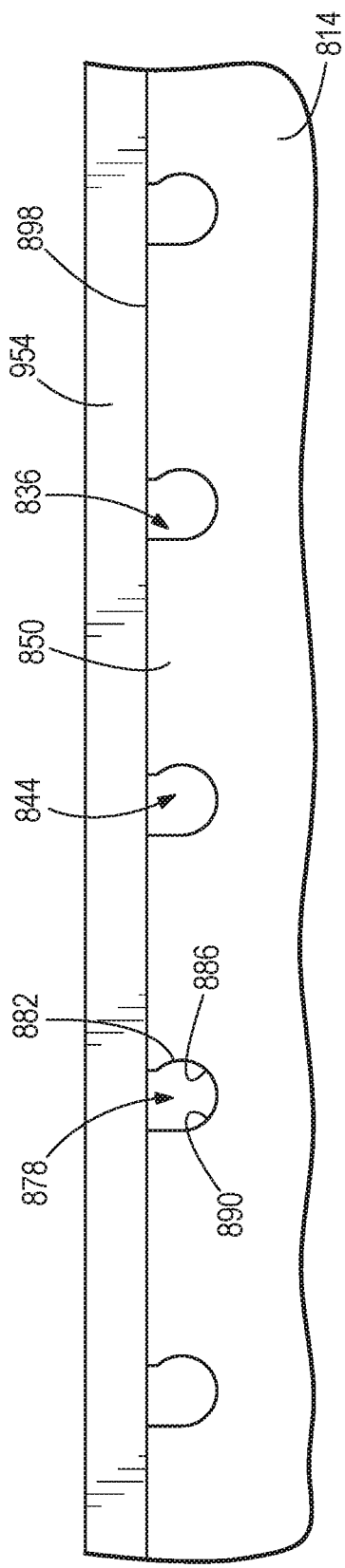
FIG. 24 illustrates a cutting strip coupled to the saw blade body of FIG. 23.
Figure 25:
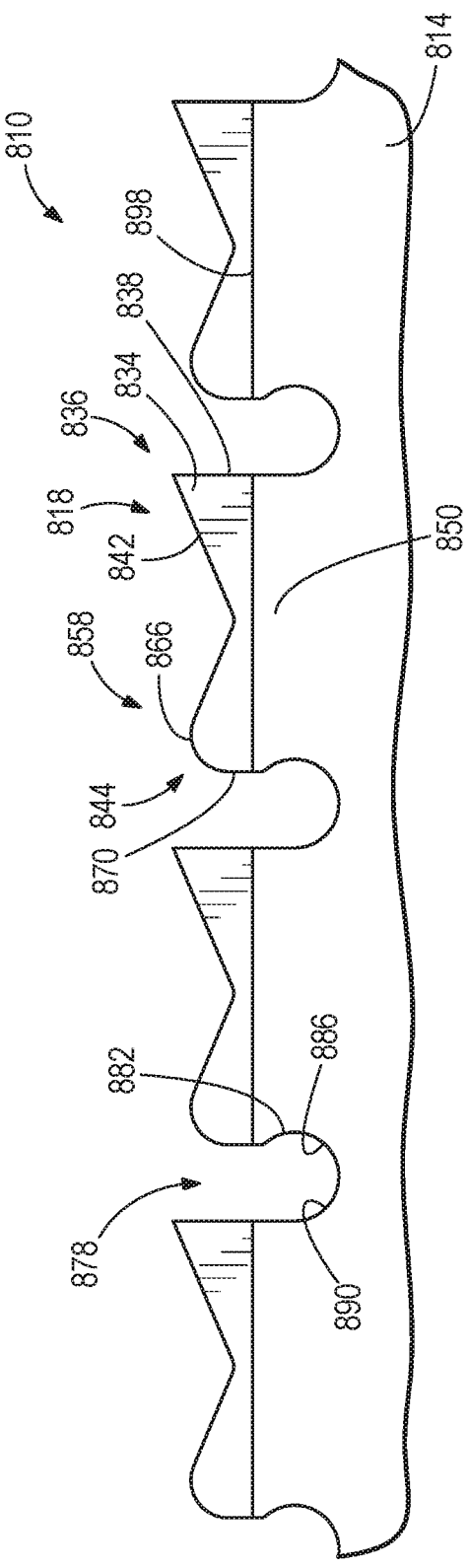
FIG. 25 illustrates cutting teeth formed by the cutting strip and the tooth bodies of FIG. 24 with gullets positioned between the cutting teeth.

FIGS. 21-25 illustrate a saw blade body 814 (FIG. 22) that is formed into a saw blade 810 (only a portion of the saw blade 810 is illustrated in FIG. 25) according to an embodiment of the invention. The saw blade 810 is similar to the saw blade 10; therefore, like components have been given like reference numbers plus 800. At least some differences and/or at least some similarities between the saw blades 10, 810 will be discussed in detail below. In addition, components or features described with respect to the saw blade 810 are equally applicable to the components or features described with respect to the saw blades 10, 210, 410, 610.

Figure 21:
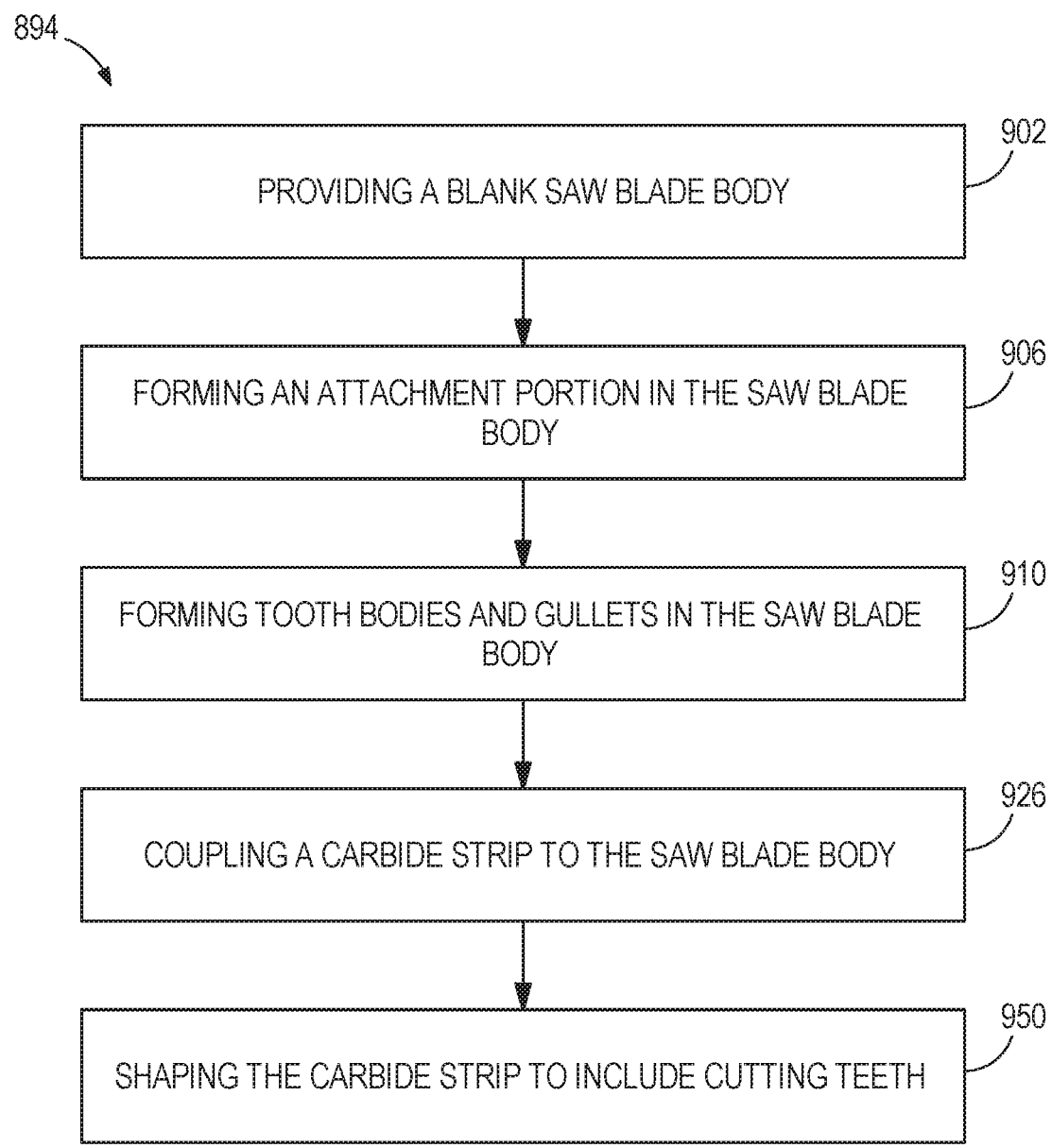
FIG. 21 is a flowchart depicting another method of manufacturing a saw blade.
Figure 22:
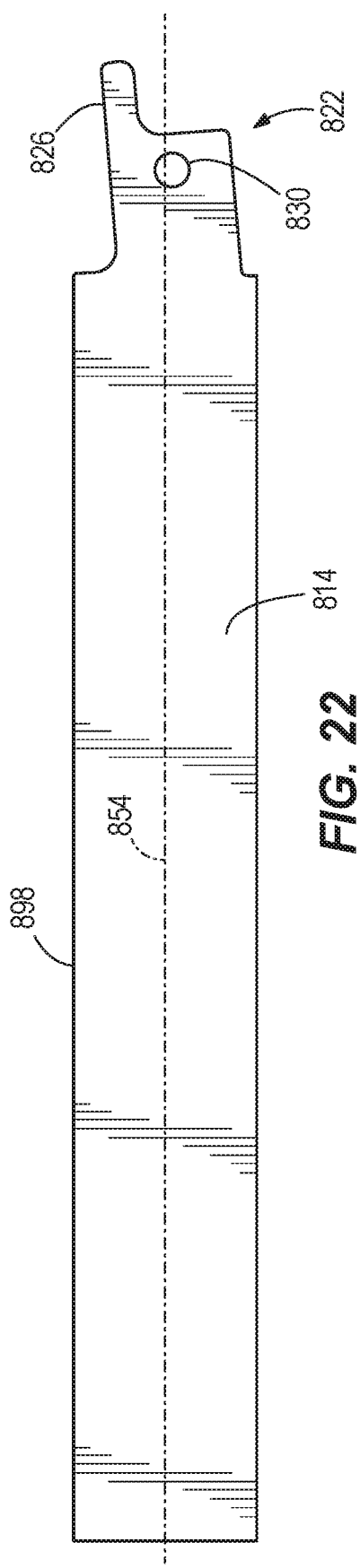
FIG. 22 illustrates an attachment portion formed in a saw blade body during the method illustrated in FIG. 21.

With reference to FIG. 21, a method 894 of manufacturing the saw blade 810 is illustrated. A blank saw blade body 814 (e.g., similar to the blank saw blade body 14; FIG. 4) is provided (step 902) and includes a longitudinal axis 854 and an edge 898. An attachment portion 822 is formed in an end of the saw blade body 814 (step 906; FIG. 22). The attachment portion 822 includes a tang 826 and an aperture 830. With reference to FIGS. 21 and 23, step 910 is provided to form tooth bodies 850 and gullets 878 in the saw blade body 814 using a first stamping die 914 (only a portion of the first stamping die 914 is illustrated in FIG. 23). The first stamping die 914 includes first cutting profiles 918 (only one cutting profile 918 is illustrated in FIG. 23). The gullets 878 include forward edges 890 and undercut portions 882 having rear edges 886.

With reference to FIGS. 21 and 24, step 926 is provided to couple a carbide strip 954 (e.g., a cutting member) to the edge 898 of the saw blade body 814 (e.g., by a welding, brazing, etc. process). In contrast to the discrete cutting inserts 746 of FIG. 19, the carbide strip 954 is a single, continuous piece of material positioned on and secured to the edge 898 of the saw blade body 814. In other embodiments, the strip 954 can be a metallic strip including a higher material hardness than the saw blade body 814.

With reference to FIGS. 21 and 25, step 950 is provided to shape the carbide strip 954 to include cutting teeth 818. In one embodiment, shaping the carbide strip 954 includes grinding the carbide insert 954 to include the cutting teeth 818. In other embodiments, shaping the carbide strip 954 includes another type of forming process (e.g., chemical erosion, electrical discharge machining, water jet cutting, laser cutting, etc.). The cutting teeth 818 include rake faces 838 on first ends 836 of the tooth bodies 850 and flat edges 870 on second ends 844 of the tooth bodies 850. The cutting teeth 818 also include cutting tip portions 834, relief faces 842, and projections 858 having rounded portions 866.

Figure 28:
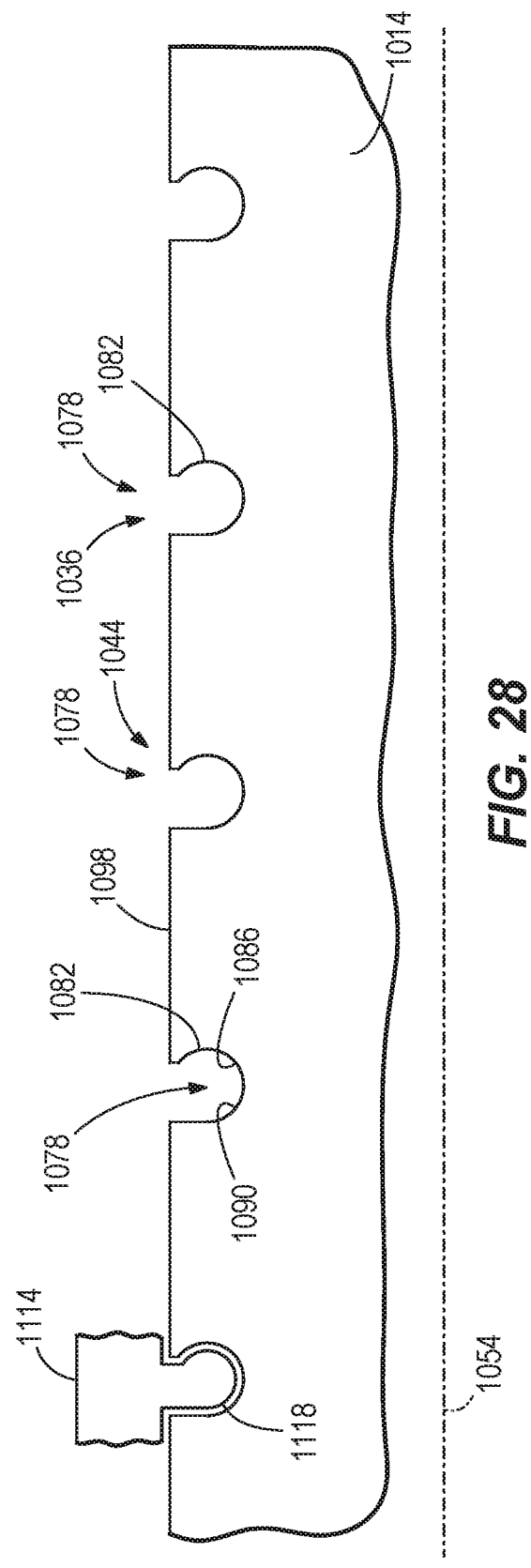
FIG. 28 illustrates tooth bodies and first gullets formed in the saw blade body of FIG. 27.
Figure 29:
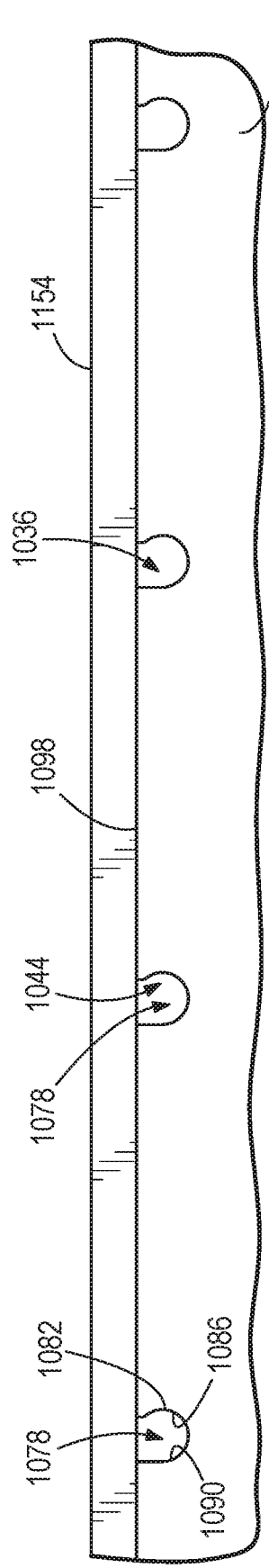
FIG. 29 illustrates a cutting strip coupled to the saw blade body of FIG. 28.
Figure 30:
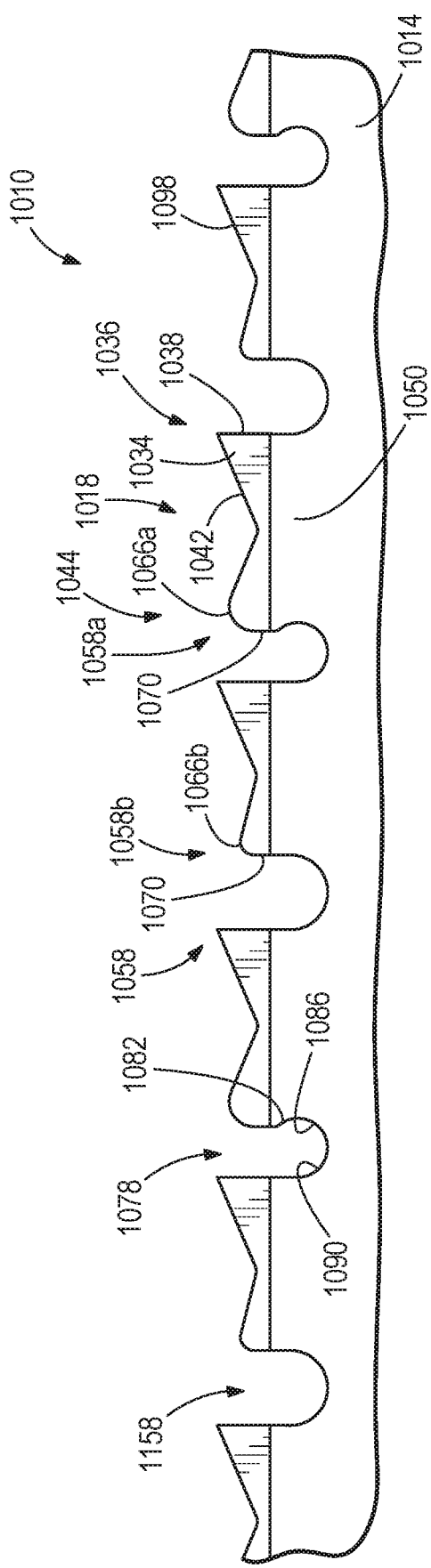
FIG. 30 illustrates cutting teeth formed by the cutting strip and the tooth bodies of FIG. 29 with the first gullets positioned between some of the cutting teeth and second gullets formed between some of the cutting teeth.

FIGS. 26-30 illustrate a saw blade body 1014 (FIG. 27) that is formed into a saw blade 1010 (only a portion of the saw blade 1010 is illustrated in FIG. 30) according to an embodiment of the invention. The saw blade 1010 is similar to the saw blade 10; therefore, like components have been given like reference numbers plus 1000. At least some differences and/or at least some similarities between the saw blades 10, 1010 will be discussed in detail below. In addition, components or features described with respect to the saw blade 1010 are equally applicable to the components or features described with respect to the saw blades 10, 210, 410, 610, 810.

Figure 26:
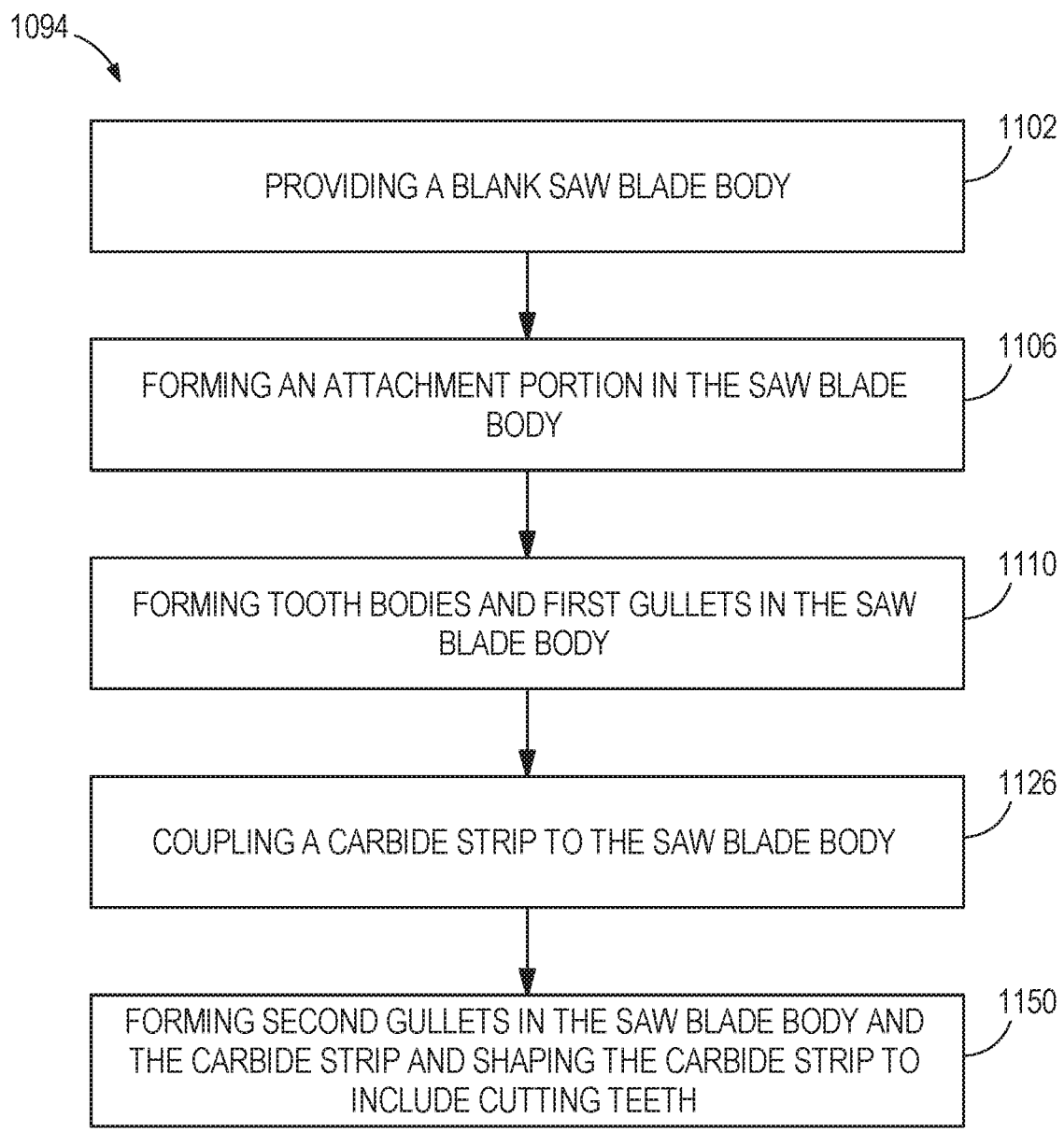
FIG. 26 is a flowchart depicting another method of manufacturing a saw blade.
Figure 27:
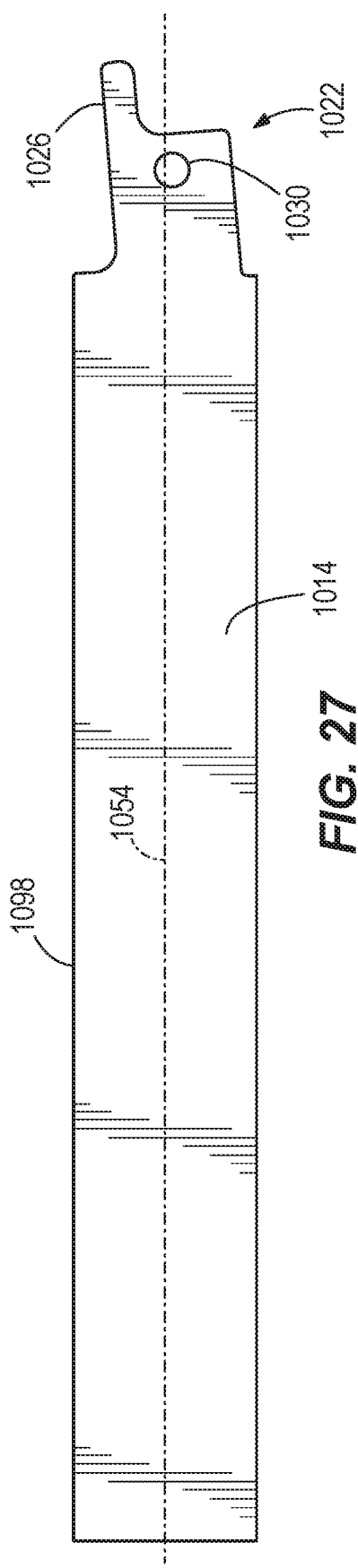
FIG. 27 illustrates an attachment portion formed in a saw blade body during the method illustrated in FIG. 26.

With reference to FIG. 26, a method 1094 of manufacturing the saw blade 1010 is illustrated. A blank saw blade body 1014 (e.g., similar to the blank saw blade body 14; FIG. 4) is provided (step 1102) and includes a longitudinal axis 1054 and an edge 1098. An attachment portion 1022 is formed in an end of the saw blade body 1014 (step 1106; FIG. 27). The attachment portion 1022 includes a tang 1026 and an aperture 1030. With reference to FIGS. 26 and 28, step 1110 is provided to form tooth bodies 1050 and first gullets 1078 in the saw blade body 1014 using a first stamping die 1114 (only a portion of the first stamping die 1114 is illustrated in FIG. 28). The first stamping die 1114 includes first cutting profiles 1118 (only one cutting profile 1118 is illustrated in FIG. 28). The first gullets 1078 include forward edges 1090 and undercut portions 1082 having rear edges 1086.

With reference to FIGS. 26 and 29, step 1126 is provided to couple a carbide strip 1154 to the edge 1098 of the saw blade body 1014 (e.g., by a welding, brazing, etc. process). Similar to the carbide strip 954 of FIG. 24, the illustrated carbide strip 1154 is a single, continuous piece of material. In other embodiments, the strip 1154 can be a metallic strip including a higher material hardness than the saw blade body 1014.

With reference to FIGS. 26 and 30, step 1150 is provided to form second gullets 1158 in the saw blade body 1014 and the carbide strip 1154 and to shape the carbide strip 1154 to include the cutting teeth 1018. The cutting teeth 1018 include rake faces 1038 on first ends 1036 of the tooth bodies 1050 and flat edges 1070 on second ends 1044 of the tooth bodies 1050. The cutting teeth 1018 also include cutting tip portions 1034, relief faces 1042, and projections 1058a, 1058b having rounded portions 1066a, 1066b. In the illustrated embodiment, the first rounded portions 1066a of the first projections 1058a are larger than the second rounded portions 1066b of the second projections 1058b. In other embodiments, the first rounded portions 1066a of the first projections 1058a can be smaller than the second rounded portions 1066b of the second projections 1058b. In other embodiments, step 1110 can include forming the second gullets 1158 in the saw blade body 1014 such that step 1110 includes forming the first and second gullets 1078, 1158 and step 1150 includes shaping the carbide strip 1154 to include the cutting teeth 1018.

In one embodiment, shaping the carbide strip 1154 includes grinding the carbide insert 1154 to include the cutting teeth 1018. In other embodiments, shaping the carbide strip 1154 includes another type of forming process (e.g., chemical erosion, electrical discharge machining, water jet cutting, laser cutting, etc.). The illustrated second gullets 1158 are formed in the saw blade body 1014 and the carbide strip 1154 after the carbide strip 1154 is coupled to the saw blade body 1014. The second gullets 1158 are similar to the first gullets 1078, and each second gullet 1158 is positioned between adjacent first gullets 1078. In the illustrated embodiment, the second gullets 1158 are straight gullets (e.g., omitting the undercut portions 1082) and include a larger radius than the first gullets 1078. In other embodiments, the second gullets 1158 can include undercut portions and/or include a smaller radius than the first gullets 1078. In one embodiment, forming the second gullets 1158 includes grinding the saw blade body 1014 with a different grinding wheel used to grind the carbide insert 1154. In other embodiments, forming the second gullets 1158 include another type of forming process (e.g., chemical erosion, electrical discharge machining, water jet cutting, laser cutting, etc.).

In other embodiments, the saw blades 10, 210, 410, 610, 810, 1010 may be other linear-edge type saw blades (e.g. a jig saw blade), or non-linear edge type saw blades (e.g., hole saws, band saws, etc.).

Although the invention has been described in detail with reference to certain preferred embodiments, variations and modifications exist within the scope and spirit of one or more independent aspects of the invention as described.

Various features and advantages of the disclosure are set forth in the following claims.

What is claimed is:

1. A method of manufacturing a saw blade, the method comprising:
   providing a saw blade body;
   forming first portions of a plurality of tooth bodies in the saw blade body and rake faces of the plurality of tooth bodies in the saw blade body such that the first portions of the plurality of tooth bodies and the rake faces of the plurality of tooth bodies define a plurality of gullets in the saw blade body, each of the rake faces located at a first end of a corresponding one of the plurality of tooth bodies, a second end of the corresponding one of the plurality of tooth bodies defining an undercut portion of each of the plurality of gullets positioned between the first portions of the plurality of tooth bodies and the saw blade body; and
   forming second portions of the plurality of tooth bodies in the saw blade body separate to forming the first portions of the plurality of tooth bodies, the rake faces of the plurality of tooth bodies, and the plurality of gullets in the saw blade body.

2. The method of claim 1, wherein the forming the first portions of the plurality of tooth bodies, the rake faces of the plurality of tooth bodies, and the plurality of gullets includes simultaneously forming
   the rake faces each extending from a first end of each of the tooth bodies toward the saw blade body,
   edges each defined by a second end of each of the tooth bodies, and
   the undercut portions, and
   wherein each of the first portions of the plurality of tooth bodies include a corresponding one of the edges of the plurality of tooth bodies.

3. The method of claim 2, wherein the forming the second portions of the plurality of tooth bodies includes simultaneously forming
   relief faces each extending from the first end of each of the tooth bodies toward the second end of the corresponding one of the tooth bodies sloping toward the saw blade body, and cutting tip portions at the first end of each of the tooth bodies.

4. The method of claim 3, wherein the forming the rake faces, the edges, and the undercut portions occurs during a first stamping process with a first stamping die, and wherein the forming the relief faces and the cutting tip portions occurs during a second stamping process with a second stamping die.

5. The method of claim 1, wherein the forming the plurality of gullets and the first portions of the plurality of tooth bodies is performed before forming the second portions of the plurality of tooth bodies.

6. The method of claim 1, wherein the forming the second portions of the plurality of tooth bodies includes forming a cutting tip of each of the tooth bodies, and wherein the forming the cutting tip of each of the tooth bodies is performed without sharpening the cutting tip of each of the tooth bodies to form a plurality of cutting teeth.

7. The method of claim 1, wherein the forming the first portions of the plurality of tooth bodies, the rake faces of the plurality of tooth bodies, and the plurality of gullets includes simultaneously forming
the rake faces each extending from a first end of each of the tooth bodies toward the saw blade body,
edges each defined by a second end of each of the tooth bodies,
the undercut portions, and
projections adjacent the second end of each of the tooth bodies sloping away from the saw blade body, and
wherein each of the first portions of the plurality of tooth bodies include a corresponding one of the edges of the plurality of tooth bodies.

8. The method of claim 7, further comprising forming the rake faces, the edges, the undercut portions, and the projections during a stamping process with a stamping die.

9. The method of claim 8, wherein the forming the second portions of the plurality of tooth bodies includes shaping the plurality of tooth bodies to form a plurality of cutting teeth.

10. The method of claim 9, wherein the shaping the plurality of tooth bodies to form the plurality of cutting teeth does not include grinding the plurality of tooth bodies to form the plurality of cutting teeth.

11. The method of claim 1, further comprising forming an attachment portion including a tang and an aperture in the saw blade body.

12. The method of claim 1, wherein during the forming the second portions of the plurality of tooth bodies, material is not removed from the saw blade body to form the plurality of gullets.

13. The method of claim 1, wherein the forming the second portions of the plurality of tooth bodies in the saw blade body does not form another gullet in the saw blade body.

* * * * *